United States Patent
Kirsch et al.

(10) Patent No.: US 11,733,370 B2
(45) Date of Patent: *Aug. 22, 2023

(54) BUILDING RADAR-CAMERA SURVEILLANCE SYSTEM

(71) Applicant: Johnson Controls Tyco IP Holdings LLP, Milwaukee, WI (US)

(72) Inventors: Lior Kirsch, Ramat Gan (IL); Yohai Falik, Petah Tikva (IL); Igal Dvir, Zichron Yaakov (IL)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 165 days.

This patent is subject to a terminal disclaimer.

(21) Appl. No.: 17/358,189

(22) Filed: Jun. 25, 2021

(65) Prior Publication Data

US 2021/0318426 A1  Oct. 14, 2021

Related U.S. Application Data

(63) Continuation of application No. 16/415,762, filed on May 17, 2019, now Pat. No. 11,061,132.

(Continued)

(51) Int. Cl.
*G01S 13/86* (2006.01)
*G01S 7/40* (2006.01)
(Continued)

(52) U.S. Cl.
CPC .......... *G01S 13/867* (2013.01); *G01S 7/4004* (2013.01); *G01S 13/42* (2013.01); *G01S 13/68* (2013.01)

(58) Field of Classification Search
None
See application file for complete search history.

(56) References Cited

U.S. PATENT DOCUMENTS

| 5,555,324 | A | 9/1996 | Waxman et al. |
| 7,124,022 | B2 * | 10/2006 | Carmichael ............... G06T 7/33 |
| | | | 342/357.62 |

(Continued)

FOREIGN PATENT DOCUMENTS

CN   103065323 A  *  4/2013  ............... G06T 7/00

OTHER PUBLICATIONS

"Homographies and image correspondences"; no author given; Computational Photography, Fall 2017, Lecture 19; Carnegie Mellon University; Pittsburgh, PA, USA; posted on the Internet at graphics.cs.cmu.edu/courses/15-463. (Year: 2017).*

(Continued)

*Primary Examiner* — Bernarr E Gregory
(74) *Attorney, Agent, or Firm* — Foley & Lardner LLP

(57) ABSTRACT

A building radar-camera system includes a camera configured to capture one or images, the one or more images including first locations within the one or more images of one or more points on a world-plane and a radar system configured to capture radar data indicating second locations on the world-plane of the one or more points. The system includes one or more processing circuits configured to receive a correspondence between the first locations and the second locations of the one or more points, generate a sphere-to-plane homography, the sphere-to-plane homography translating between points captured by the camera modeled on a unit-sphere and the world-plane based on the correspondence between the first locations and the second locations, and translate one or more additional points captured by the camera or captured by the radar system between the unit-sphere and the world-plane based on the sphere-to-plane homography.

20 Claims, 31 Drawing Sheets

Related U.S. Application Data

(60) Provisional application No. 62/674,111, filed on May 21, 2018.

(51) Int. Cl.
*G01S 13/42* (2006.01)
*G01S 13/68* (2006.01)
*G01S 13/00* (2006.01)

(56) References Cited

U.S. PATENT DOCUMENTS

| | | | | |
|---|---|---|---|---|
| 8,385,687 | B1* | 2/2013 | Blais-Morin | G06T 7/337 |
| | | | | 382/293 |
| 8,582,810 | B2 | 11/2013 | Campbell | |
| 9,215,382 | B1 | 12/2015 | Hilde | |
| 9,977,123 | B2 | 5/2018 | Chen et al. | |
| 11,061,132 | B2* | 7/2021 | Kirsch | G01S 13/867 |
| 2003/0053658 | A1* | 3/2003 | Pavlidis | G06V 40/20 |
| | | | | 348/E7.086 |
| 2003/0053659 | A1* | 3/2003 | Pavlidis | G06V 20/52 |
| | | | | 382/103 |
| 2003/0123703 | A1* | 7/2003 | Pavlidis | G06T 7/277 |
| | | | | 382/103 |
| 2004/0071367 | A1* | 4/2004 | Irani | G06T 7/38 |
| | | | | 382/284 |
| 2006/0123050 | A1 | 6/2006 | Carmichael et al. | |
| 2010/0182400 | A1 | 7/2010 | Nelson et al. | |
| 2011/0140892 | A1* | 6/2011 | Chen | G08B 13/19645 |
| | | | | 340/541 |
| 2012/0274505 | A1 | 11/2012 | Pritt et al. | |
| 2013/0077821 | A1* | 3/2013 | Chen | G06T 3/4053 |
| | | | | 382/103 |
| 2013/0083959 | A1* | 4/2013 | Owechko | G06T 7/344 |
| | | | | 382/103 |
| 2015/0338515 | A1* | 11/2015 | Chen | G01S 13/867 |
| | | | | 342/52 |
| 2016/0140713 | A1 | 5/2016 | Martin | |

OTHER PUBLICATIONS

European Search Report on EP Appl. No. 21210977 dated Mar. 15, 2022 (9 pages).

EP Search Report for EP Application No. 19175555.2, dated Sep. 25, 2019, 8 pages.

Kirsch, Lior, "Deep Camera Radar", IMVC 2018, Mar. 6, 2018, 3 pages, Abstract and Bio only.

Li, S., "Full-view spherical image camera," Proceedings / The 18th International Conference on Pattern Recognition, Hong Kong, Aug. 20-24, 2006, IEEE Computer Society, Los Alamitos, CA [U.A.], vol. 4, Jan. 1, 2006, pp. 386-390.

Mei, et al., "Single View Point Omnidirectional Camera Calibration from Planar Grids", 2007 IEEE international Conference on Robotics and Automation, Apr. 10-14, 2007, Rome, Italy, IEEE, Piscataway, NJ, USA, Apr. 10, 2007, pp. 3945-3950.

Puwein et al., "PTZ Camera Network Calibration from Moving People in Sports Broadcasts", Applications of Computer Vision (WACV), 2012 IEEE Workshop on, IEEE, Jan. 9, 2012, pp. 25-32.

Zyczkowski et al., "Integrated mobile radar-camera system in airport perimeter security", Unmanned/Unattended Sensors and Sensor Networks VIII, Spie, 1000 20th Street Bellingham, WA 98225-6705, USA, vol. 8184, No. 1, Oct. 6, 2011, pp. 1-9.

\* cited by examiner

Frame t    Frame t+1

BUILDING RADAR-CAMERA SURVEILLANCE SYSTEM

CROSS-REFERENCE TO RELATED APPLICATION

This application is a continuation of U.S. application Ser. No. 16/415,762, filed May 17, 2019, now U.S. Pat. No. 11,061,132, which claims the benefit of and priority to U.S. Provisional Patent Application No. 62/674,111, filed May 21, 2018, the entirety of which is incorporated by reference herein.

BACKGROUND

The present disclosure relates generally to the field of building security systems. The present disclosure relates more particularly to systems and methods for building surveillance.

A building surveillance system can include one or multiple cameras. Often, the number of cameras that need to be included in a building to capture all areas of a building or building premises is high. These numerous cameras result in an excessive cost of the building surveillance system, excessive installation time, etc. Furthermore, footage captured by the cameras may only be valuable in good visibility conditions. For example, at night or with various weather conditions (e.g., fog, rain, snow, etc.), the cameras may not capture footage of individuals that would normally be captured during good visibility conditions.

In addition to the costs associated with a high number of camera systems, surveillance systems may also be associated with high installation and calibration costs. Calibrating the camera systems can take a significant amount of time and technician expertise. For example, a significant amount of technician resources may be required to properly install and calibrate the surveillance system. In some instances, the cost of installing and calibrating a surveillance system may be greater than the cost of the surveillance system itself.

SUMMARY

One implementation of the present disclosure is a building radar-camera system including a camera configured to capture one or images, the one or more images including first locations within the one or more images of one or more points on a world-plane and a radar system configured to capture radar data indicating second locations on the world-plane of the one or more points. The system includes one or more processing circuits configured to receive a correspondence between the first locations and the second locations of the one or more points, the correspondence associating each of the first locations with one of the second locations, generate a sphere-to-plane homography, the sphere-to-plane homography translating between points captured by the camera modeled on a unit-sphere and the world-plane based on the correspondence between the first locations and the second locations, and translate one or more additional points captured by the camera or captured by the radar system between the unit-sphere and the world-plane based on the sphere-to-plane homography.

In some embodiments, the one or more processing circuits are configured to perform an external camera calibration by receiving a set of images from the camera, the set of images being captured by the camera while moving to track an object, transferring a set of detections of the set of images to a first image of the set of images based on one or more homographies, receiving a radar track from the radar system, the radar track indicating locations of the object overtime, determining a homography between the first image and the world-plane based on the set of detections transferred to the first image and the radar track, and determining a second correspondence between the set of detections and the radar track based on the set of detections transferred to the world-plane and the radar track.

In some embodiments, the one or more processing circuits are configured to perform an external camera calibration by receiving camera tracks indication locations of an object in pixel values across a set of images of the camera, the set of images being captured by the camera while moving to track the object, transferring the pixel values to a first image of the set of images based on one or more homographies, receiving radar tracks from the radar system, the radar tracks indicating locations of the object overtime in angle values, determine a plurality of distances between the camera tracks and the radar tracks based on the pixel values transferred to the first image and the angle values, and perform a matching algorithm to match the radar tracks with the camera tracks based on the plurality of distances.

In some embodiments, the one or more processing circuits are configured to receive a detection of an object from the radar system in the world-plane, determine, based on a homography, a location of the object in a camera plane of the camera, determine a center location in the world-plane with the homography based on a center of the camera plane, determine a pan pixel in the camera plane based on the location of the object in the camera plane and the center of the camera plane, determine a pan location in the world-plane based on the pan pixel and the homography, determine a camera pan to center the object in a field of view of the camera as a first angle between the center location and the pan location, determine a camera tilt to center the object in the field of view of the camera by determining a second angle between the detection of the object and the pan location, and operate the camera to center the object in the field of view of the camera based on the camera pan and the camera tilt.

In some embodiments, the one or more processing circuits are configured to perform an external calibration by operating the camera to sequentially center a set of world-points within a field of view of the camera, generate a plurality of direction rays, each of the plurality of direction rays including a pan value and a tilt value used to control the camera to center one world-point of the set of world-points within the field of view of the camera, determine a homography between a virtual screen intersected by the plurality of direction rays and the world-plane, and translate between a point on the world-plane and a particular pan value and a particular tilt value based on the homography.

In some embodiments, the one or more processing circuits are configured to perform an internal camera calibration by panning the camera at a zoom level by a predefined number of degrees, estimating a pixel distance indicating a distance panned by the camera in pixel units based on a homography, determining a focal length for the zoom level based on the predefined number of degrees and the pixel distance, and fitting a function with the focal length and the zoom level and a plurality of other focal lengths, each of the plurality of other focal lengths corresponding to one of a plurality of zoom levels.

In some embodiments, the function is a monotonous increasing function. In some embodiments, fitting the function includes optimizing an objective function to determine a value of the function for each of the plurality of zoom levels with respect to an optimization constraint. In some embodiments, the optimization constraint indicates that a current value of the function is greater than or equal to a previous value of the function.

In some embodiments, the one or more processing circuits are configured to generate the sphere-to-plane homography by performing an optimization to identify values for the sphere-to-plane homography that minimize one or more error values.

In some embodiments, the one or more error values are a first error value indicating a geodesics distance between the first locations and the second locations translated onto the unit-sphere with the values of the sphere-to-plane homography and a second error value indicating a planar distance between the first locations translated onto the world-plane with the values of the sphere-to-plane homography and the second locations.

Another implementation of the present disclosure is a method of a building radar-camera system, the method including receiving, by one or more processing circuits, one or more images from a camera, the one or more images including first locations within the one or more images of one or more points on a world-plane and receiving, by the one or more processing circuits, radar data from a radar system, the radar data indicating second locations on the world-plane of the one or more points. The method further including receiving, by the one or more processing circuits, a correspondence between the first locations and the second locations of the one or more points, the correspondence associating each of the first locations with one of the second locations, generating, by the one or more processing circuits, a sphere-to-plane homography, the sphere-to-plane homography translating between points captured by the camera modeled on a unit-sphere and the world-plane based on the correspondence between the first locations and the second locations, and translating, by the one or more processing circuits, one or more additional points captured by the camera or captured by the radar system between the unit-sphere and the world-plane based on the sphere-to-plane homography.

In some embodiments, the method includes performing, by the one or more processing circuits, an external camera calibration by receiving a set of images from the camera, the set of images being captured by the camera while moving to track an object, transferring a set of detections of the set of images to a first image of the set of images based on one or more homographies, receiving a radar track from the radar system, the radar track indicating locations of the object overtime, determining a homography between the first image and the world-plane based on the set of detections transferred to the first image and the radar track, and determining a second correspondence between the set of detections and the radar track based on the set of detections transferred to the world-plane and the radar track.

In some embodiments, the method further includes performing, by the one or more processing circuits, an external camera calibration by receiving camera tracks indication locations of an object in pixel values across a set of images of the camera, the set of images being captured by the camera while moving to track the object, transferring the pixel values to a first image of the set of images based on one or more homographies, receiving radar tracks from the radar system, the radar tracks indicating locations of the object overtime in angle values, determining a plurality of distances between the camera tracks and the radar tracks based on the pixel values transferred to the first image and the angle values, and performing a matching algorithm to match the radar tracks with the camera tracks based on the plurality of distances.

In some embodiments, the method further includes receiving, by the one or more processing circuits, a detection of an object from the radar system in the world-plane, determining, by the one or more processing circuits, a location of the object in a camera plane of the camera based on a homography, determining, by the one or more processing circuits, a center location in the world-plane with the homography based on a center of the camera plane, determining, by the one or more processing circuits, a pan pixel in the camera plane based on the location of the object in the camera plane and the center of the camera plane, determining, by the one or more processing circuits, a pan location in the world-plane based on the pan pixel and the homography, determining, by the one or more processing circuits, a camera pan to center the object in a field of view of the camera as a first angle between the center location and the pan location, determining, by the one or more processing circuits, a camera tilt to center the object in the field of view of the camera by determining a second angle between the detection of the object and the pan location, and operating, by the one or more processing circuits, the camera to center the object in the field of view of the camera based on the camera pan and the camera tilt.

In some embodiments, the method includes performing, by the one or more processing circuits, an external calibration by operating the camera to sequentially center a set of world-points within a field of view of the camera, generating a plurality of direction rays, each of the plurality of direction rays including a pan value and a tilt value used to control the camera to center one world point of the set of world-points within the field of view of the camera, determining a homography between a virtual screen intersected by the plurality of direction rays and the world-plane, and translating between a point on the world-plane and a particular pan value and a particular tilt value based on the homography.

In some embodiments, the method includes performing, by the one or more processing circuits, an internal camera calibration by panning the camera at a zoom level by a predefined number of degrees, estimating a pixel distance indicating a distance panned by the camera in pixel units based on a homography, determining a focal length for the zoom level based on the predefined number of degrees and the pixel distance, and fitting a function with the focal length and the zoom level and a plurality of other focal lengths, each of the plurality of other focal lengths corresponding to one of a plurality of zoom levels.

In some embodiments, the function is a monotonous increasing function. In some embodiments, fitting the function includes optimizing an objective function to determine a value of the function for each of the plurality of zoom levels with respect to an optimization constraint. In some embodiments, the optimization constraint indicates that a current value of the function is greater than or equal to a previous value of the function In some embodiments, generating, by the one or more processing circuits, the sphere-to-plane homography includes performing an optimization to identify values for the sphere-to-plane homography that minimize one or more error values.

In some embodiments, the one or more error values are a first error value indicating a geodesics distance between the first locations and the second locations translated onto the unit-sphere with the values of the sphere-to-plane homography and a second error value indicating a planar distance between the first locations translated onto the world-plane with the values of the sphere-to-plane homography and the second locations.

Another implementation of the present disclosure is a building surveillance system including a camera configured to capture one or images, the one or more images including first locations within the one or more images of one or more points on a world-plane and one or more processing circuits. The one or more processing circuits are configured to receive a correspondence between the first locations and a second locations of the one or more points within the world-plane, the correspondence associating each of the first locations with one of the second locations, generate a sphere-to-plane homography, the sphere-to-plane homography translating between points captured by the camera modeled on a unit-sphere and the world-plane based on the correspondence between the first locations and the second locations by performing an optimization to identify values for the sphere-to-plane homography that minimize one or more error values, and translate one or more additional points captured by the camera between the unit-sphere and the world-plane based on the sphere-to-plane homography.

In some embodiments, the one or more error values are a first error value indicating a geodesics distance between the first locations and the second locations translated onto the unit-sphere with the values of the sphere-to-plane homography and a second error value indicating a planar distance between the first locations translated onto the world-plane with the values of the sphere-to-plane homography and the second locations.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, a building surveillance radar-camera system is shown, according to various exemplary embodiments. The radar-camera system can combine various artificial intelligence classification networks (e.g., Retinanet) with building cameras (e.g., pan, tilt, and zoom (PTZ) cameras) and a ground radar system to facilitate surveillance for a building premise. The system can be autonomous and require little or no human control or involvement in calibration. When the radar system detects a moving object (e.g., a person, an animal a car, etc.), the system can be configured to control cameras to capture images of the moving object and classify the moving object, e.g., determine whether the object is a person, a vehicle, an animal, etc. Using both a radar system and a camera system can solve problems in conventional surveillance systems that require a high number of static cameras and/or human security personal.

A conventional surveillance system can suffer from a high false alarm rate which may be especially prevalent in systems with moving PTZ cameras. Furthermore, the conventional system may lack high quality object detection and classification; these conventional systems may generate the same alert for a person as it would for an animal. Furthermore, the conventional system may perform poorly in various poor vision environmental conditions, e.g., at night, in heavy fog, etc.

The surveillance system described herein can be configured to utilize improved classification networks, can include improved object tracking for controlling a PTZ camera from a central system (e.g., a server), can perform internal camera parameter calibration, external camera parameter calibration. The internal parameters may be parameters that depend upon location and/or orientation of a camera. The internal parameters may be parameters of the camera that a used to move or zoom that camera e.g., focal length. The external parameters may be parameters between the camera and the outside world, for example, a translation between points identified in a camera space to a world space. To perform the external calibration, a system may use or determine corresponding pairs of data between the camera space and the world space, e.g., a correspondence of points of the camera space (detected via the camera) and the world space (detected via the radar system).

The system discussed herein is configured to accurately detect, classify, and/or track objects in real-time, and estimate their real-world position, in some embodiments. By using the radar system and laser cameras, the system discussed herein can overcome various issues faced by conventional surveillance systems. The system described herein may be a partially or fully automated surveillance system that uses a radar system and a small number of PTZ cameras that can replace a high number of static cameras and/or human security personal in a conventional surveillance system.

Building Security System

Figure 1:
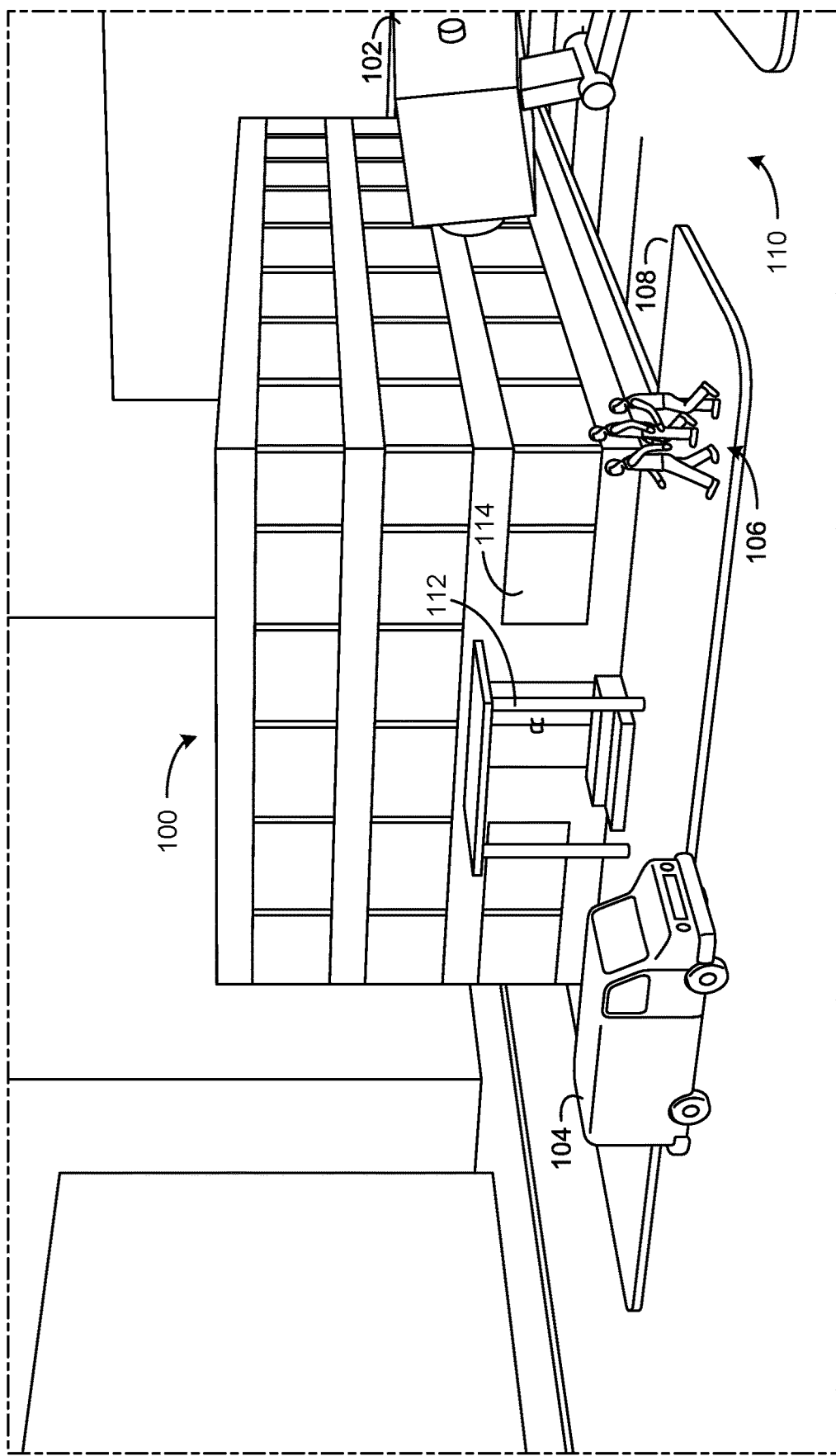
FIG. 1 is a perspective view schematic drawing of a building with a security system, according to some embodiments.

Referring now to FIG. 1, a building 100 with a security camera 102 and a parking lot 110 is shown, according to an exemplary embodiment. The building 100 is a multi-story commercial building surrounded by, or near, the parking lot 110 but can be any type of building in some embodiments. The building 100 may be a school, a hospital, a store, a place of business, a residence, a hotel, an office building, an apartment complex, etc. The building 100 can be associated with the parking lot 110.

Both the building 100 and the parking lot 110 are at least partially in the field of view of the security camera 102. In some embodiments, multiple security cameras 102 may be used to capture the entire building 100 and parking lot 110 not in (or in to create multiple angles of overlapping or the same field of view) the field of view of a single security camera 102. The parking lot 110 can be used by one or more vehicles 104 where the vehicles 104 can be either stationary or moving (e.g. busses, cars, trucks, delivery vehicles). The building 100 and parking lot 110 can be further used by one or more pedestrians 106 who can traverse the parking lot 110 and/or enter and/or exit the building 100. The building 100 may be further surrounded, or partially surrounded, by a sidewalk 108 to facilitate the foot traffic of one or more pedestrians 106, facilitate deliveries, etc. In other embodiments, the building 100 may be one of many buildings belonging to a single industrial park, shopping mall, or commercial park having a common parking lot and security camera 102. In another embodiment, the building 100 may be a residential building or multiple residential buildings that share a common roadway or parking lot.

The building 100 is shown to include a door 112 and multiple windows 114. An access control system can be implemented within the building 100 to secure these potential entrance ways of the building 100. For example, badge readers can be positioned outside the door 112 to restrict access to the building 100. The pedestrians 106 can each be associated with access badges that they can utilize with the access control system to gain access to the building 100 through the door 112. Furthermore, other interior doors within the building 100 can include access readers. In some embodiments, the doors are secured through biometric information, e.g., facial recognition, fingerprint scanners, etc. The access control system can generate events, e.g., an indication that a particular user or particular badge has interacted with the door. Furthermore, if the door 112 is forced open, the access control system, via door sensor, can detect the door forced open (DFO) event.

The windows 114 can be secured by the access control system via burglar alarm sensors. These sensors can be configured to measure vibrations associated with the window 114. If vibration patterns or levels of vibrations are sensed by the sensors of the window 114, a burglar alarm can be generated by the access control system for the window 114.

Figure 2:
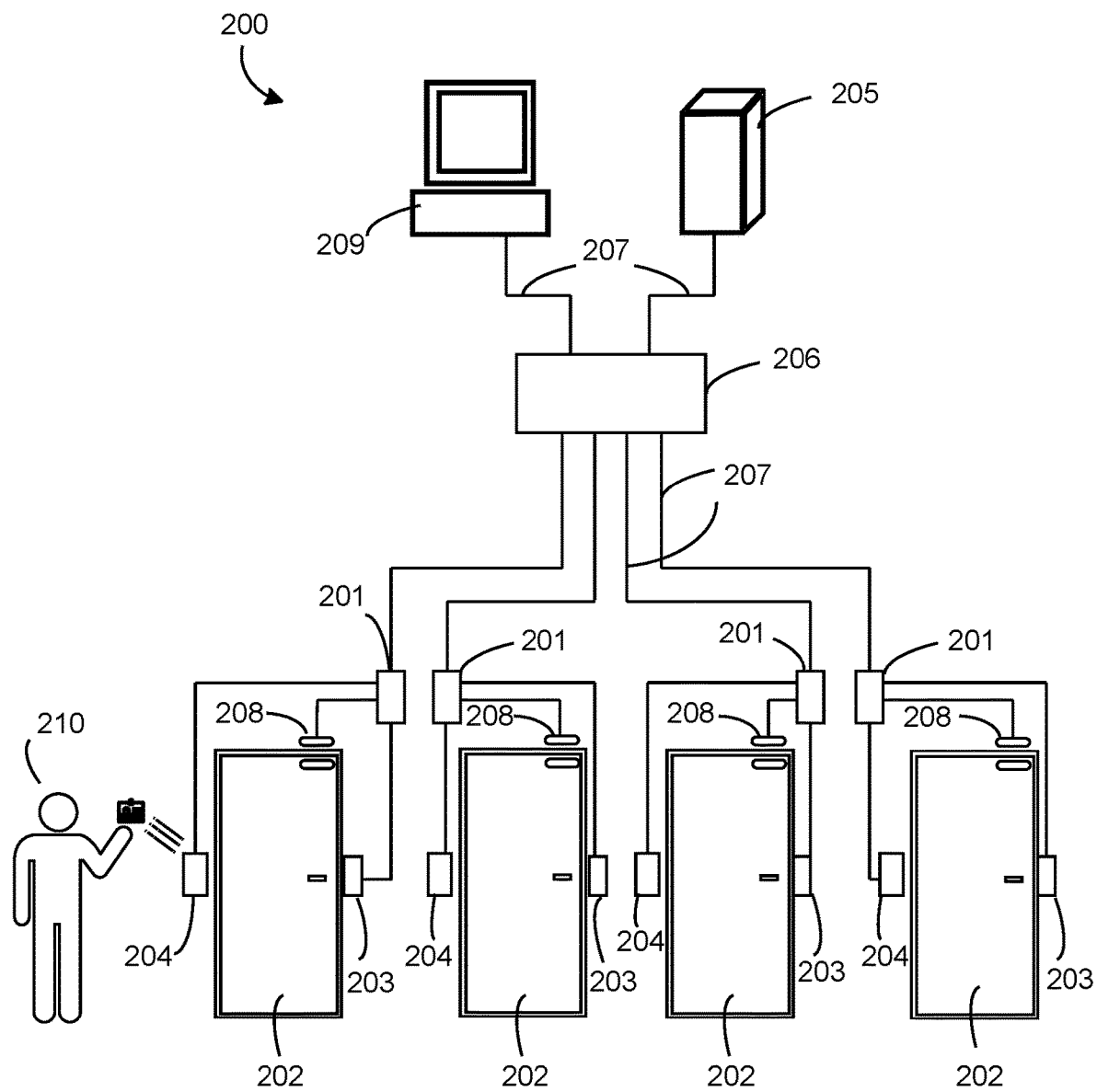
FIG. 2 is a block diagram illustrating several components of an access control system (ACS) that can be implemented in the building security system of FIG. 2, according to some embodiments.

Referring now to FIG. 2, a block diagram of an ACS 200 is shown, according to an exemplary embodiment. The ACS 200 can be implemented in any of the building 100 as described with reference to FIG. 1. The ACS 200 is shown to include doors 202. Each of the doors 202 is associated with a door lock 203, an access reader module 204, and one or more door sensors 208. The door locks 203, the access reader modules 204, and the door sensors 208 may be connected to access controllers 201. The access controllers 201 may be connected to a network switch 206 that directs signals, according to the configuration of the ACS 200, through network connections 207 (e.g., physical wires or wireless communications links) interconnecting the access controllers 201 to an ACS server 205. The ACS server 205 may be connected to an end-user terminal or interface 209 through network switch 206 and the network connections 207.

The ACS 200 can be configured to grant or deny access to a controlled or secured area. For example, a person 210 may approach the access reader module 204 and present credentials, such as an access card. The access reader module 204 may read the access card to identify a card ID or user ID associated with the access card. The card ID or user ID may be sent from the access reader module 204 to the access controller 201, which determines whether to unlock the door lock 203 or open the door 202 based on whether the person 210 associated with the card ID or user ID has permission to access the controlled or secured area.

Camera-Radar Surveillance System

Figure 3:
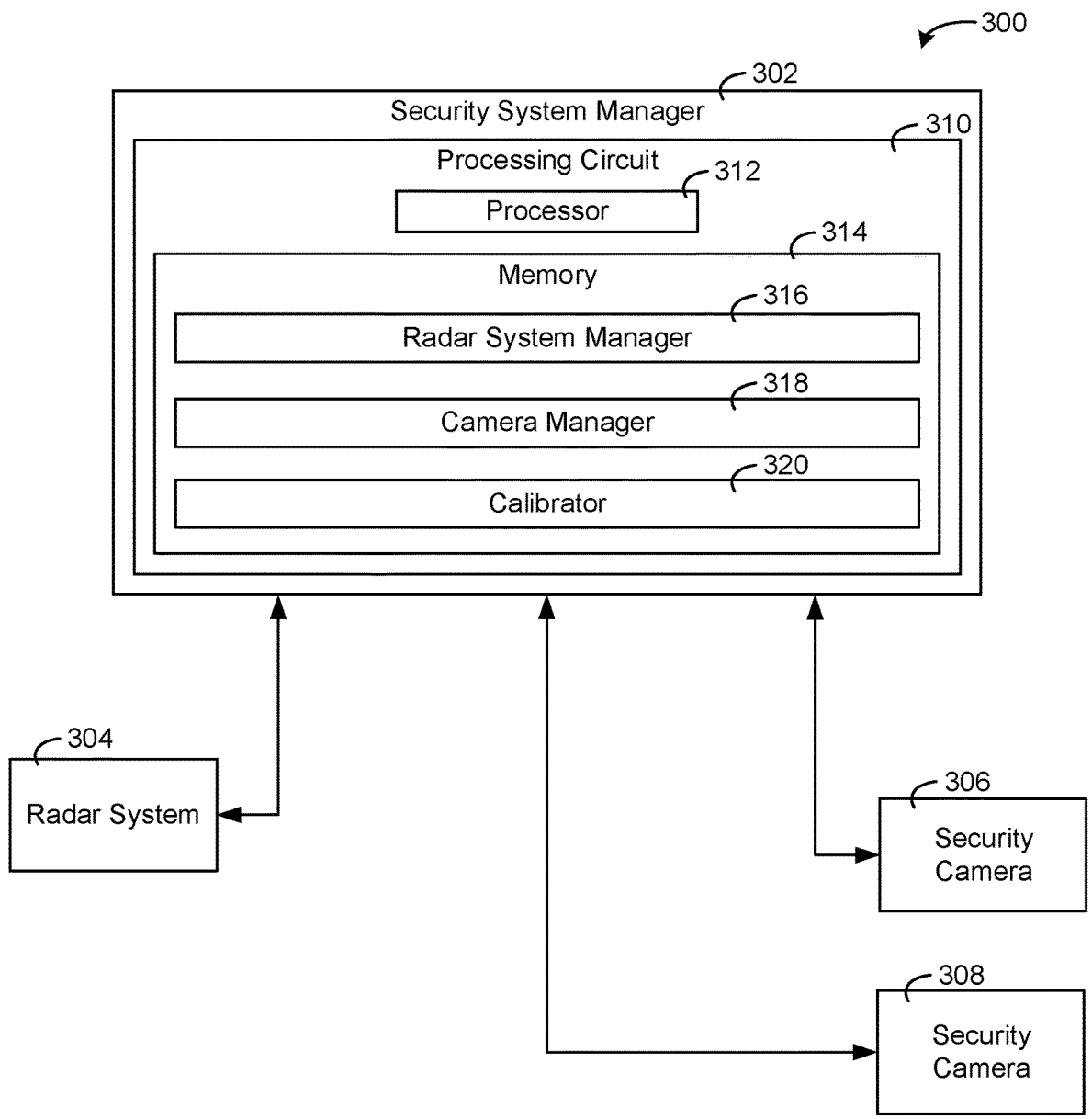
FIG. 3 is a block diagram of a building radar-camera system for the building of FIG. 1, according to an exemplary embodiment.

Referring now to FIG. 3, a radar-camera system 300 is shown, according to an exemplary embodiment. The radar-camera system 300 can be implemented in the building 100 of FIG. 1 and configured to perform surveillance at the building 100, in some embodiments. System 300 can be implemented in a commercial building, in an oil and/or gas production site, in a utility substation, at a car lot, in a neighborhood, in an airport, in mass a transit system, in an entire city, in a smart building, etc. The system 300 can be a combination of an autonomous PTZ camera system and a radar system. The system 300 is configured to detect, classify, track, and/or estimate real-world positions for objects in real-time, in some embodiments. The system 300 can monitor and/or detect objects, understand and gather information on the objects (e.g., classify the objects), and/or respond to the classification (e.g., raise an alarm, unlock a door, etc.). The images of the cameras may be high resolution, containing a high number of pixels. A higher number of pixels may result in better detection, tracking, and classification by the system 300. This may also enable or improve facial recognition performed by the system 300.

The system 300 can be a partial or fully autonomous surveillance system. Surveillance and video analytics is an advantageous component in a building security system in some embodiments. Since in many systems, the number of security cameras grows exponentially over time to cover as many views of a building as possible, having a human constantly watch and understand footage of the building that is captured by the security cameras can be difficult. It may not be feasible to have a human monitor every camera of a building since the number of cameras may be high. The system 300 can address these issues by automatically controlling building security cameras and/or analyzing security footage, according to some embodiments.

Some image analysis systems suffer from high false alarm rates. High false alarm rates can result from moving PTZ cameras, a lack of high quality object classification (e.g., an animal and a person may generate the same alert), and/or poor vision conditions (e.g., night, fog, etc.). Some video analytics may be based on change detection, in some embodiments. A change detection system may be a system that detects objects based elements in an image changing with respect to a background. However, bad weather, clouds, camera noise and especially moving cameras can limit the quality and robustness of change detection. Due to the limitations of change detection video analysis, a change detection system may require substantial human supervision. Artificial Intelligence (AI) based classification can run on individual frames, may not be sensitive to camera movements, and can be robust to outdoor conditions (e.g., shadows, rain, etc.), all areas in which change detection systems may fall short. Furthermore, based on the calibration between the radar system and the camera system, objects and their sizes detected in the images to help reduce false alarms. For example, if a user is detected in in an unauthorized area but, based on the calibration, the user is a taller than a predefined amount as can be determined via the calibration, the system can determine that the user is not properly classified and that the object is a different class (e.g., a tree) and thus an alarm can be stopped from being triggered.

The system 300 is configured to implement one or more of AI algorithms, a radar system, laser cameras, and/or powerful graphics processing units, in some embodiments. These components can allow the system 300 to implement a partial and/or fully autonomous surveillance system, in some embodiments. The system 300 can be configured to implement AI algorithms to perform object detection and classification with deep neural networks (DNNs). The system 300 can include a GPU configured to implement DNNs. The performance of object detection and classification by the system 300 can be high even for moving cameras.

The system 300 is further configured to include a radar system, in some embodiments. The radar system may provide a cost efficient and accurate system that is not limited by poor weather conditions (e.g., fog, night, etc.). Furthermore, the system 300 can include laser cameras. In some embodiments, the laser cameras are infrared (IR) laser cameras configured to view objects at night up to 400 meters. In some embodiments, the laser cameras and the radar system are used with millimeter wave cameras or other vision system. GPU computational power enables the system 300 to run DNNs at affordable prices, GPUs may provide much higher image processing power than CPUs.

The system 300 is configured to control the orientation (e.g., the pan, tilt, and/or zoom) based on radar detections in some embodiments. For example, when the system 300 detects an object via the radar system, the system 300 can control an appropriate camera to be pointed at the object and can be configured to utilize artificial intelligence to track and classify the object (at a reliability better than humans). Furthermore, the system 300 is configured to facilitate a handover of an object from a first camera to a second camera if the object is moving from a view space of the first camera into the view space of a second camera. Since the cameras 306 and/or 308 can be controlled to track an object, object tracking over a wide range can be achieved.

The system 300 is shown to include a security system manager 302. The manager 302 can be a central system of the system 300 configured to communicate and/or control a radar system 304 and/or security cameras 306 and/or 308, according to some embodiments. The manager 302 can be implemented on premises within the building 100 of FIG. 1 and/or off-premises in a cloud system, e.g., a MICROSOFT AZURE system, an AMAZON WEB SERVICES (AWS), and/or any other remote web server and/or system.

The manager 302 is shown to include a processing circuit 310. The processing circuit 310 can be any central purpose processor (CPU), graphics processing unit (GPU), application specific integrated circuit (ASIC), and/or any other component for performing computations combined with memory devices. The processing circuit 310 is shown to include a processor 312 and a memory 314. In some embodiments, the security system manager 302 is made up of multiple processing circuits that are distributed across multiple computing systems, servers, controllers, etc. However, as an illustrative embodiment, the security system manager 302 is described with a single processing circuit, the processing circuit 310 which can be one or multiple processing circuits.

The processing circuit 310 is shown to include a processor 312 and a memory 314. The processing circuit 310 can include any number of processing devices and/or memory devices. The processor 312 can be implemented as a general purpose processor, an application specific integrated circuit (ASIC), one or more field programmable gate arrays (FPGAs), a group of processing components, or other suitable electronic processing components. The memory 314 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. The memory 314 can be or include volatile memory and/or non-volatile memory.

The memory 314 can include object code components, script components, or any other type of information structure for supporting the various activities and information structures described in the present application. According to some embodiments, the memory 314 is communicably connected to the processor 312 via the processing circuit 310 and can include computer code for executing (e.g., by the processing circuit 310 and/or the processor 312) one or more processes of functionality described herein.

The radar system 304 may be a radar system deployed at the building 100 of FIG. 1 configured to communicate with the manager 302, according to some embodiments. The radar system 304 may a MAGOS radar system. The radar system 304 can utilize Multiple Input Multiple Output (MIMO) and digital beam forming technology to cover an area of over 250,000 m² (>61 acres) with a detection range of 400 m for a person walking and 600 m for vehicle and/or boat. The radar system 304 is, in some embodiments, a low power system that consumes an extremely lower amount of power and/or may be a cost effective radar solution. A MAGOS radar system may consume <3.5 W and have small form factor. The MAGOS radar system can include an ultra-high range resolution of 0.4 meters giving it excellent performance in cluttered environments. The MAGOS radar system may be small in size, low in power consumption, and low in weight make it simple to install and rendering it ideal as a deployable system as well. The radar system can be configured to provide wide tracking track objects during the day and/or night and/or in all types of weather. Some applications may not include the radar system 304 but still may require camera tracking with the cameras 306 and/or 308.

The radar system 304 can identify the locations of objects and track the objects as they move. The radar system 304 may identify the locations of the objects as coordinate values and/or angles and distances from the radar system 304 on a world plane. In some embodiments, the systems and methods discussed herein can utilize other world plane based systems, e.g., an electric fence, an access control system (e.g., as described with reference to FIG. 2), pressure sensors located around a building, etc.

The cameras 306 and 308 may be security cameras that are movable, i.e., the cameras 306 and/or 308 are configured to pan, tilt, or zoom (e.g., ×30 zoom), according to some embodiments. The cameras 306 and/or 308 are configured to capture high resolution images and/or video in some embodiments. The manager 302 can control the orientation of the cameras 306 and/or 308. In some embodiments, the cameras 306 and/or 308 are infrared (IR) cameras that can be capture high quality images at night at long ranges. In some embodiments, the security cameras 306 and/or 308 are positioned in various location entrances, on rooftops, on outer walls, on grounds of a facility, in various locations to capture images and/or video of a user, animal, and/or vehicle walking, moving, and/or driving. Although the system 300 is shown to include two cameras, the system 300 can include any number of cameras.

The memory 314 of the manager 302 is shown to include a radar system manager 316, a camera manager 318, and a calibrator 320. The camera manager 318 can be configured to detect objects within a frame and/or frames captured by the cameras 306 and/or 308. The camera manager 318 is configured to classify each of the detected objects and/or track the objects if the objects are moving, in some embodiments. The camera manager 318 is configured to implement classification networks (e.g., DNNs) to perform the object detection and/or classification in some embodiments. The camera manager 318 is configured to implement a deep learning framework to track objects in video captured by cameras 306 and/or 308 in some embodiments. The camera manager 318 can perform deep object-detection on each frame and use temporal information to create consistent tracks and remove false detections.

The camera manager 318 can be configured to track and identify objects via a fusion of radar data of the radar system 304 and/or images captured by cameras 306 and/or 308. The camera manager 318 can receive radar data, e.g., from radar system manager 316, and control cameras 306 and/or 308 based on the radar data. For example, if radar system 304 detects a moving person, car, and/or animal at specific coordinates, camera manager 318 can control the movement of cameras 306 and/or 308 to move (pan, tilt, and/or zoom) to view the moving object. The camera manager 318 can detect the object and track the object, continuing to move the cameras 306 and/or 308 to keep the object within a frame captured by the cameras 306 and/or 308.

The camera manager 318 can control the cameras 306 and/or 308 so that the object is kept in the middle of the frame. In some embodiments, the camera manager 318 is configured to classify the moving object, e.g., as a person, as an animal, as a car, as a boat, etc. The camera manager 318 can be configured to perform error correction and/or filtering to improve image classification and/or tracking. The camera manger 318 can perform error correction and filtering for object type classification confidence, object width in meters, speed of objects in meters per second, and/or location of an object (e.g., latitude and/or longitude). The error correction and/or filtering can work with and/or after all of the steps of the processes described herein. There may be a balance between image detection, classification, and/or tracking speed (e.g., whether the performance is real-time or near real-time) and accuracy. In some embodiments, the camera manger 318 is configured to handle four video streams in parallel but can be configured to handle any number of video streams.

The calibrator 320 can be configured to perform semi-automatic and/or automatic calibration of cameras 306 and/or 308. The calibrator 320 can be configured to perform a camera-to-world calibration method for the cameras 306 and 308. The calibration may be agnostic to zoom levels for the cameras 306 and 308. The calibrator 320 can be configured to solve an optimization problem which maps between the visual objects captured by the cameras 306 and/or 306 and a world space of the radar system 304. The optimization can be performed by only using correspondences between the camera orientation and world coordinates. This can remove the need to calibrate internal camera parameters although in some embodiments, the internal camera parameters may still be calibrated.

Furthermore, the calibrator 320 can be configured to perform a calibration for the various focal lengths of the cameras 306 and/or 308 automatically without a man-in-the-loop. This enables a moving object to be kept in the center of the image from a remote machine, overcoming communication delays. The calibration performed by the calibrator 320 can be highly accurate and can help fully and/or partially automate the system 300; the calibration can improve the object classification and tracking of the camera manager 318.

The radar system manager 316 can be configured to communicate with and/or control the radar system 304. The radar system manager 316 can be configured to receive coordinates of moving objects from radar system 304. In some embodiments, the radar system manager 316 is configured to generate and/or store a world view, coordinate based mapping of various objects detected by the radar system 304. The radar system manager 316 is configured to provide the world view coordinates to camera manager 318 so that camera manager 318 can control cameras 306 and/or 308 and to calibrator 320 for calibration performed by calibrator 320, according to an exemplary embodiment. In some embodiments, the radar system manager 316 is configured to store and record a track of an object by recording the position over time.

The manager 302, the radar system 304, and/or the cameras 306 and/or 308 can share bounding boxes. A bounding box may be an indication of a group of pixels in an image that are pixels of a particular object, e.g., a person, a car, a boat, etc. The bounding box can be based on Java Script Object Notation (JSON). Furthermore, a link to a live video stream of cameras 306 and/or 308 can be embedded in boxes inside a web-container.

The system 300 can further include and/or integrate with a video management system (VMS) and/or physical security information management (PSIM) system. For example, the system 300 can retrieve, and/or make available, a video stream of cameras 306 and/or 308 with an embedded box around a detected object in a web-container (e.g., the images shown in FIGS. 31-34). Furthermore, the system 300 can receive and/or send bounding box information (e.g., an indication of the object, human, animal, vehicle, with a time tag to overlay part (e.g., the top) of the video). In some embodiments, the bounding box can be embedded within a real-time streaming protocol (RTSP). The system 300 can act as RTSP proxy and send synchronized bounding box metadata to various integrated systems.

Still referring to FIG. 3, the system 300 is shown to include a central security system manager 302. In some embodiments, the system manager 302 may be distributed to edge devices. For example, camera 306, camera 308, and/or radar system 304 can run some and/or all of the functions of manager 302. This can remove long communication delays if any are present and improve the real-time response of the system 300. Furthermore, the number and/or power of manager 302, can be increased, e.g., adding more and/or more powerful GPUs. This can increase object classification reliability and/or can increase the number of types of objects that the manager 302 can classify.

Figure 4:
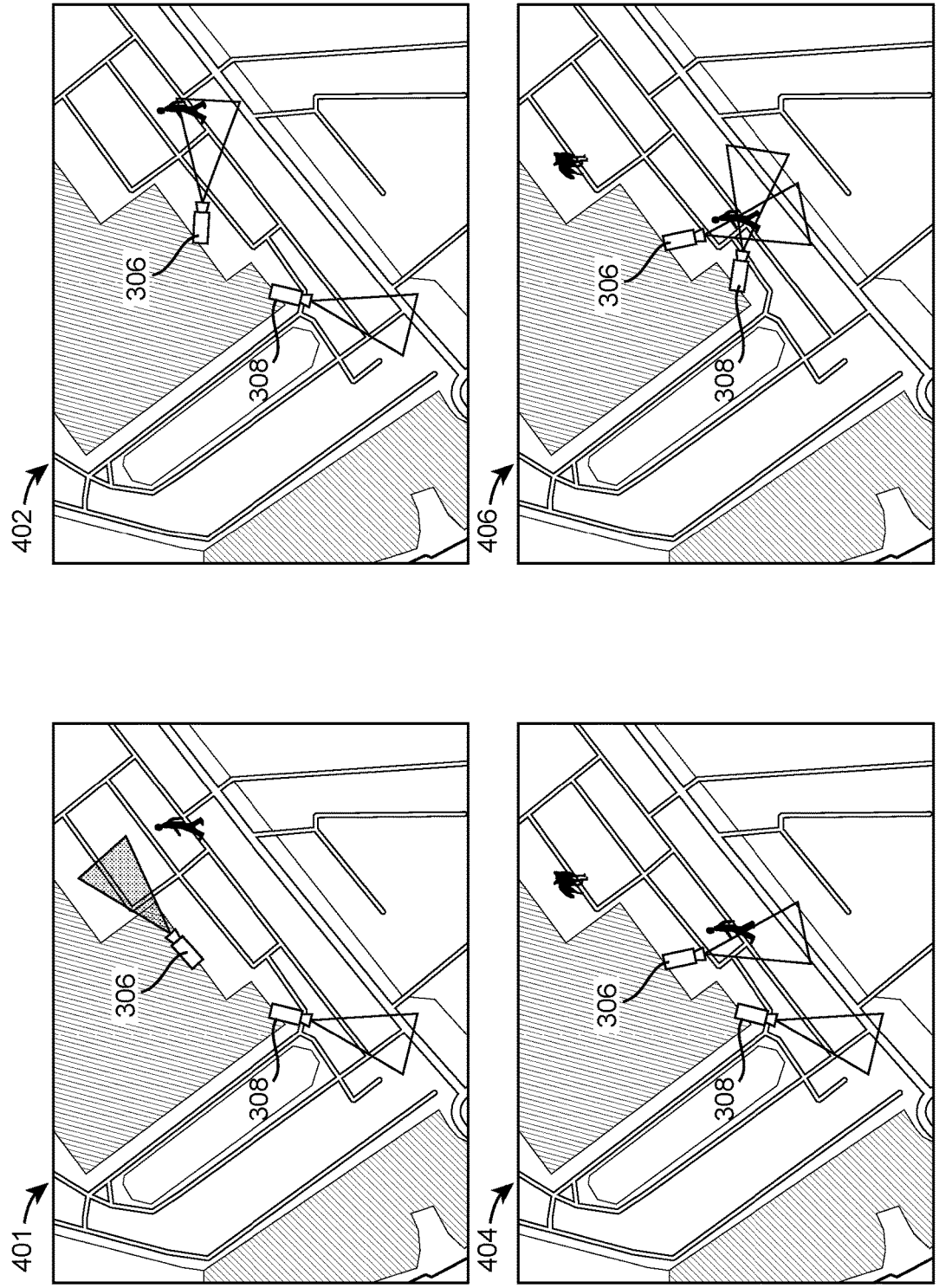
FIG. 4 is a drawing of the building radar-camera system of FIG. 3 controlling cameras to track an individual, according to an exemplary embodiment.

Referring now to FIG. 4, images 401-406 illustrating the system 300 tracking a person is shown, according to an exemplary embodiment. In image 401 the cameras 306 and 308 are shown. In image 402, the camera 306 is controlled by the camera manager 318 to capture images of the user. The individual can be detected by the radar system 304. Based on the detection of the radar system 304, the camera manager 318 is configured to control (e.g., control pan, tilt, and/or zoom) the camera 306 to capture images of the individual. As the individual moves, the camera manager 318 can cause the camera 308 to pick up the individual, performing a handover between the cameras 306 and 308. In some embodiments, the system 300 does not respond to certain objects e.g., animals if the system 300 is configured to only track animals. In some embodiments, the system 300 is configured to only detect and/or track objects that are within a predefine range of a building.

Each of the cameras 306 and 308 can scan their environment and report on specific targets. The system 300 can be configured to utilize a centralized computer which analysis every frame captured by the cameras 306 and 308 in real-time and understand what the object is. The radar system can efficiently detect both static and moving objects. Based on radar and/or camera detection, the manager 302 can place the moving object on a map and raise an alarm. Furthermore, based on the detection of the radar and/or solely based on camera detection, the manager 302 can generate a world position estimate of a moving object.

Figure 5:
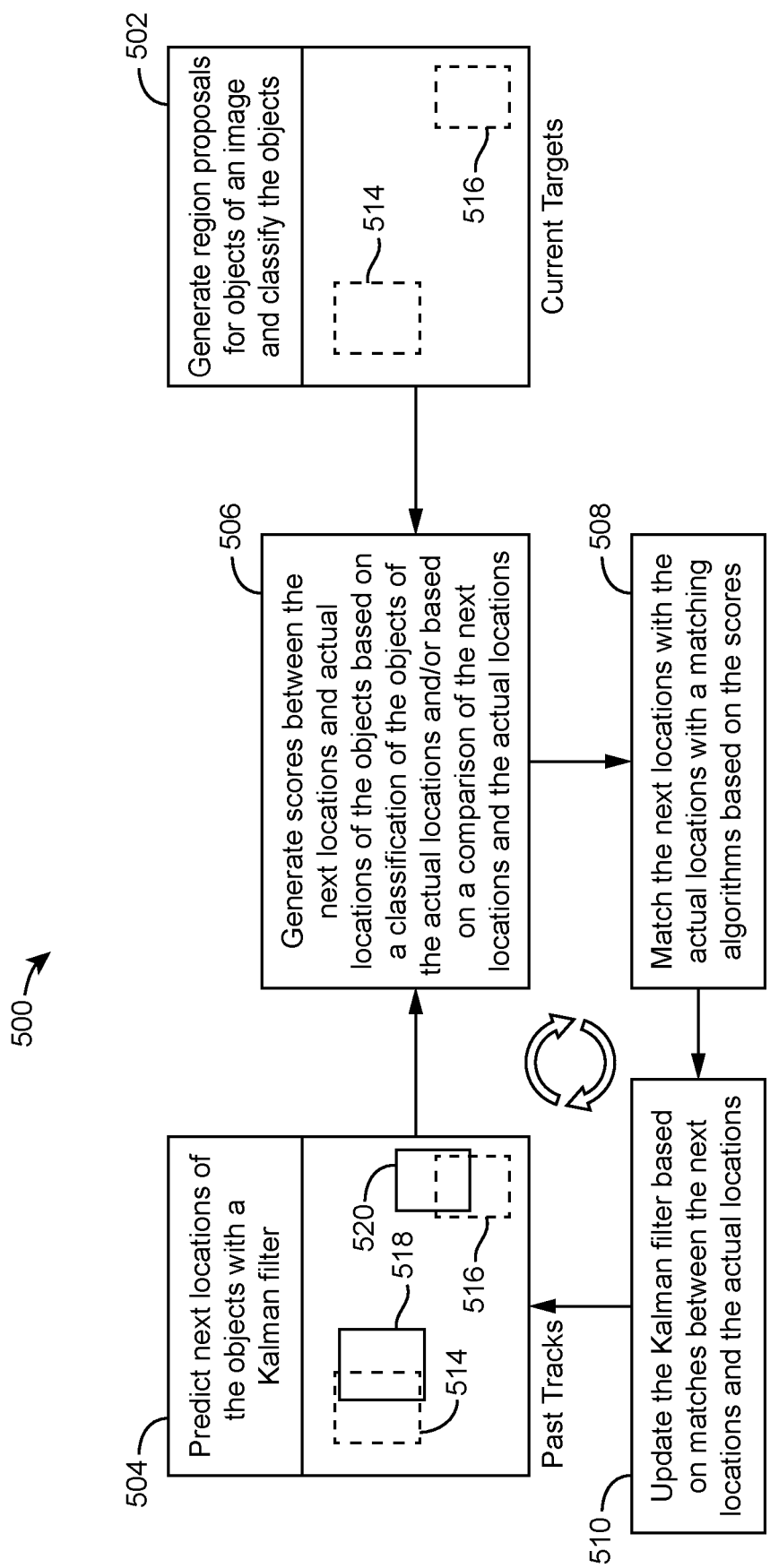
FIG. 5 is a flow diagram of a process for performing object tracking that the building radar-camera system of FIG. 3 can be configured to perform, according to an exemplary embodiment.

Referring now to FIG. 5, a process 500 is shown for detecting and tracking an object. The process 500 can be performed by the camera manager 318 with a classification model (e.g., a neural network, a faster regional convolutional neural network (R-CNN), etc.), a Kalman filter, and/or matching algorithms (e.g., a Hungarian matching algorithm), and/or camera movement compensation algorithms. The camera manager 318 can be configured to perform the process 500. The process 500 may be similar to the processes described with reference to FIGS. 8-11.

In step 502, the camera manager 328 can generate proposals for targets in an image captured by a camera. The proposals may be groups of pixels, e.g., pixels bound by a box, that the camera manger 328 determines should be classified. The camera manager 328 can utilize a classification model to identify the regions of the image that should be classified as one of a set of known objects (e.g., vehicles, people, animals, plants, etc.). In some embodiments, the camera manager 328 is configured to use a faster R-CNN. Using a faster R-CNN may result in a small number of pixel area proposals. The camera manager 328 can use various object classification algorithms, e.g., decision trees, Bayesian networks, etc. to classify the objects of the image proposals. Region proposals 514 and 516 illustrate areas of an image that the camera manager 328 may identify as pertaining to a particular target to be tracked by the camera manager 328.

In step 504, the camera manager 328 can predict next locations of the objects within the image with a Kalman. The next locations may be a prediction, the prediction locations 518 and 520, of where the objects represented by the region proposals 514 and 516 will move to in the future, e.g., in a next frame. The Kalman filter can use one or multiple previous frames, object detections, and previous predictions to generate the predicted next locations 518 and 520.

In step 506, the camera manager 328 can score the prediction of the Kalman filter by generating a score between each of the predictions 518 and 520 and actual locations of the objects in a current frame (a frame subsequent to the frame used to generate the prediction locations 518 and 520). The score may indicate the likelihood that a detection of an object in a current image is a previously detected object or a new object. For example, for a particular object detected in a current frame, the score between the predicted next location 518 and the current detection of the object may indicate the likelihood that the current detection of the object is the same object as the object associated with the prediction location 518. This allows the camera manager 328 to track objects through multiple frames and identify new objects. In some embodiments, a matrix of scores is generated to associate a score between each prediction based on a first frame of the step 504 and each actual location of the objects of the subsequent frame.

In some embodiments, the scores are based on a comparison of locations of the next locations and the actual locations. For example, the scores can be distances between the predicted next locations and the actual locations. If the next locations and actual locations are represented as pixel areas, the scores can be Intersection-Over-Union (IoU) scores, i.e., an area of intersection of the pixel areas divided by an area of union of the pixel areas. Furthermore, the scores can be based on object classifications. For example, a predicted next location for a human may be scored with an actual location of a classified human differently than the predicted next location for the human an a second actual location of a car. In some embodiments, one or all of the scoring techniques can be used to generate the scores.

In step 508, the camera manager 328 can match the next locations and the actual locations via a matching algorithm based on the scores. If a match is determined between an object of an actual location and a predicted next location, the object of the actual location and the predicted next location can be determined to be the same object and thus the camera manager 328 can maintain a track of the object. Such a determination can be performed by the camera manager 328 for each of multiple objects in the image. If an object with an actual location does not match any predicted next location of the step 504, the camera manager 328 can determine that the object is a new object and can begin tracking the new object. The matching algorithm can be any type of algorithm. For example, the matching algorithm may be a Hungarian matching algorithm.

Based on the matches determined in the step 508, in step 510, camera manager 328 can update the Kalman filter used to predict the next locations in step 504. For example, the tracks used as input into the Kalman filter to generate the next locations 518 and 520 can be based on the tracks determined via the step 508, i.e., a sequence of actual locations of an identified object through multiple frames. The process of predicting the next location of an object (the step 504), scoring the next location of the object with actual detected locations of the objects (the step 506), determining whether the next location and the actual location area associated with the same object based on the score (the step 508), and updating the Kalman filter (the step 510) can be performed iteratively such that objects are tracked through time and new objects are identified as the new objects enter the frames.

Figure 6:
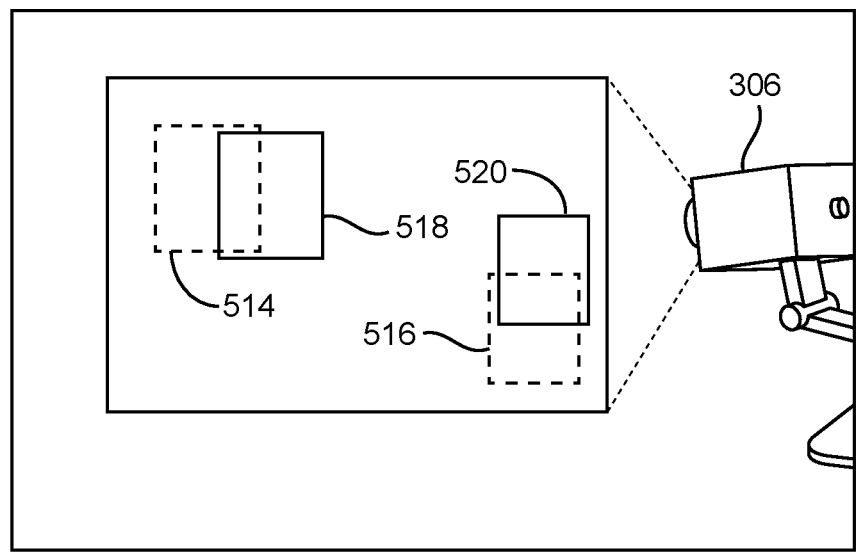
FIG. 6 is a diagram of object tracking of the process of FIG. 5, according to an exemplary embodiment.
Figure 7:
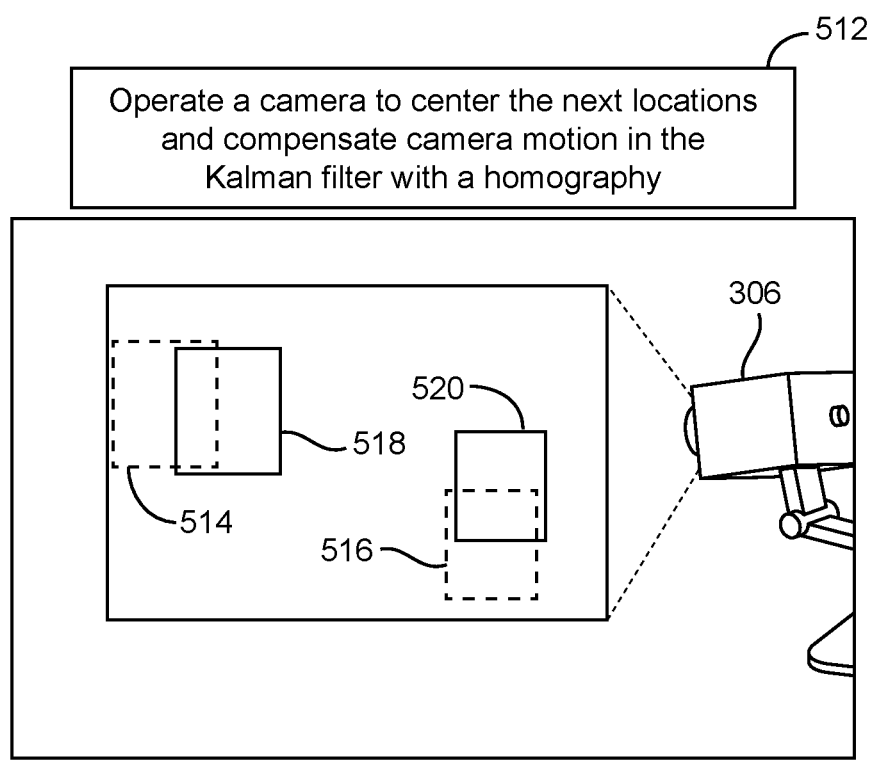
FIG. 7 is a diagram of object tracking of the process of FIG. 5 where the tracking includes camera motion compensation, according to an exemplary embodiment.

Referring now to FIGS. 6-7, the camera 306 can be controlled by the camera manager 328 to maintain a target within the image based on the prediction of the Kalman filter. As can be seen, the camera is adjusted so that tracked objects are kept within the frame. As shown in FIGS. 6-7, two objects are shown represented by the predicted next locations 518 and 520 and the region proposals 514 and 516. However, any number of objects can be detected and tracked. The camera manager 328 can be configured to pan, tilt, or zoom the camera 306 such that the predicted next locations 518 and 520 are centered within the frame of the camera. When multiple simultaneous objects are detected, multiple cameras (e.g., two cameras) can point towards both objects or one camera can point to one object and another camera can point to another object.

Because the camera 306 is moved to a new position, the Kalman filter used to predict the next locations 518 and 520 may become inaccurate or lose the objects the Kalman filter is tracking. To compensate for the camera movement, the camera manager 528 can compensate for the movement of a camera in the Kalman filter with a homography. In some embodiments, a step 512 of the process 500 described with reference to FIG. 5 includes operating, by the camera manager 528, the camera 306 to center the next locations 518 and 520 and perform motion compensation within the Kalman filter with a homography. The motion compensation may include adjusting one or more parameters of the Kalman filter based on the homography. In some embodiments, the camera manager 528 translates points of the frame from the new camera position back to a previous camera position or a "first frame" with the homography. In this regard, the Kalman filter may operate according to a static reference.

Figure 8:
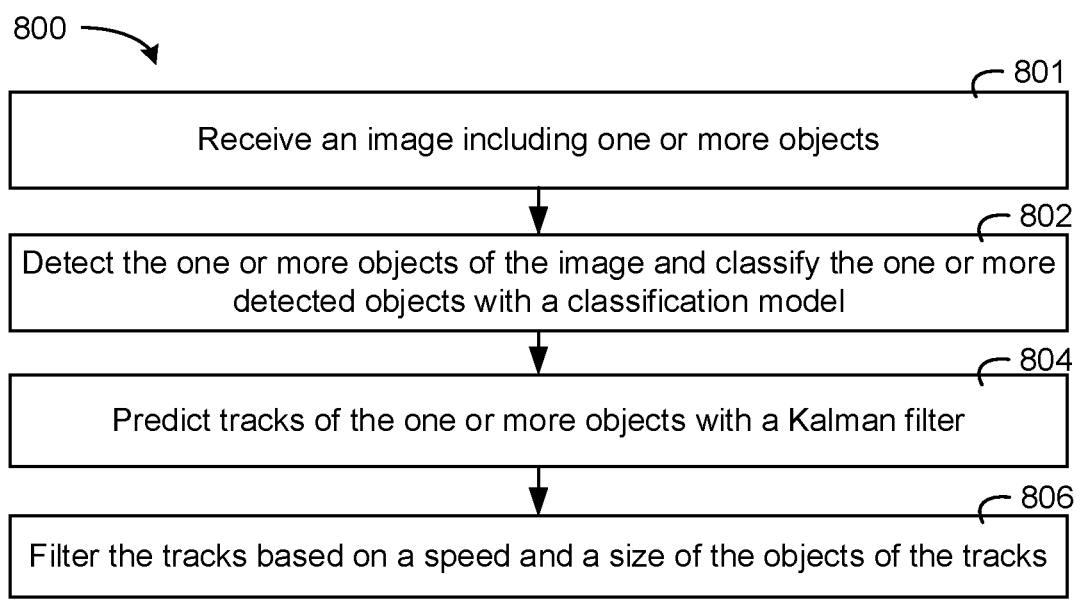
FIG. 8 is a flow diagram of a process for performing object detection and classification, object tracking, and static track filtering that can be performed by the building radar-camera system of FIG. 3, according to an exemplary embodiment.

Referring now to FIG. 8, a process 800 for object classification and tracking is shown that can be performed by the security system manager 302, according to an exemplary embodiment. While any computing device described herein can be configured to perform the process 800, e.g., the security system manager 302, the process 800 is described with reference to the camera manager 318. The process 800 is shown to include four steps, all of which can be performed by the camera manager 318. In step 801, the camera manager 318 can receive an image including one or more objects. In some embodiments, the camera manager 318 receives the image from a database or from one of the cameras 306 and/or 308.

In step 802, the camera manager 318 can detect the one or more objects and classify the one or more objects with a classification model. For example, based on the images received in the step 801, the camera manager 318 can detect an object, either stationary or moving, and classify the object, e.g., classify the object as a person, a vehicle, an animal, etc. The camera manager 318 can implement a neural network, e.g., a faster R-CNN to perform the object detection and/or classification. The step 802 is described in greater detail in FIG. 9.

In step 804, the camera manager 318 can track the detected and classified object of step 802. The camera manager 318 can generate a prediction of where in an image captured by a camera the object will be and/or can control the camera to keep the object within the image (e.g., keep the object at the center of the image captured by the camera). The camera manger 318 can implement a Kalman filter to perform the object tracking. Specifically, the camera manager 318 can generate a prediction of where the object will be based on the Kalman filter. The step 804 is described in greater detail in FIG. 10.

In step 806, the camera manager 318 can perform filtering of the tracks of the objects generated in the step 804 (or over multiple iterations of the steps 802 and 804) based on speed and size of the objects. The camera manager 318 can perform the step 806 to identify a speed of the object by averaging a speed of the object over time and then normalizing the speed of the object based on a size of the object to account for a distance of the object from the camera. The normalization can take into account the fact that a smaller object is farther away from the camera and is traveling at a greater speed than an object closer to the camera even if the speed reported by the Kalman filter for both objects is the same. The tracks filtered by the camera manager 318 may be static tracks, i.e., tracks of an object that do not change in speed by a predefined amount and/or tracks of an object where the object does not change in size by a predefined amount. The tracks may be tracks created by the camera manager 318 based on the tracked object and may be a sequence of positions of the object over time. The step 806 is described in further detail as its own process in FIG. 11.

Figure 9:
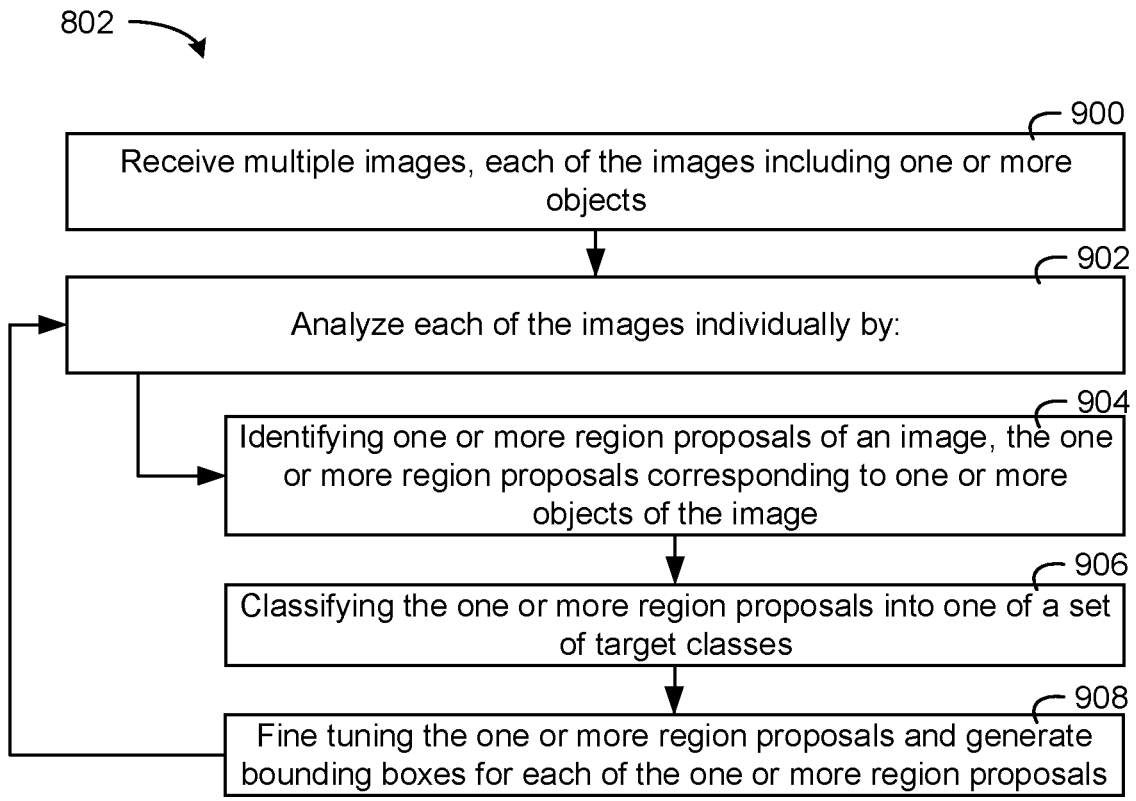
FIG. 9 is a flow diagram of a process illustrating the object detection and classification of the process of FIG. 8 that can be performed by the building radar-camera system of FIG. 3, according to an exemplary embodiment.

Referring now to FIG. 9, the step 802 is shown in greater detail as a process that the camera manager 318 is configured to perform, according to an exemplary embodiment. The process can include multiple steps, i.e., the steps 900-908. While any computing device described herein can be configured to perform the step 802, e.g., the security system manager 302, the step 802 is described with reference to the camera manager 318. In step 900, the camera manager 318 can receive multiple images, each image including one or more objects. The images can be footage of a camera captured over time, i.e., each image may be a video frame. In some embodiments, the camera manager 318 receives the image from a database or from one of the cameras 306 and/or 308.

The step 802 can be performed with a tensor flow model and/or can be performed on GPUs e.g., 1080TI GPUs. The system 300 can optimize the performance of the 1080TI with optimization based on visual molecular dynamics (VMD) while camera is not moving. While there is a tradeoff between speed and quality, the step 802 can be performed on video frames at 13 FPS with high definition video (HD) by tuning parameters for one GPU. For four cameras operating simultaneously each at 8 FPS (HD video), two GPUs can be used by the camera manager 318.

In the step 902, the camera manager 318 can analyze each image of the images received in the step 900 according to sub-steps 904-908. The steps 904-908 can be performed iteratively, for example, if the images of the step 900 are received one by one, the sub-steps 904-908 can be performed each time a new image is received.

In the sub-step 904, the camera manager 318 can identify multiple region proposals within the images, each of the region proposals corresponding to one of the one or more objects. The proposal regions may be areas (e.g., groups of pixels) within an image where the camera manager 318 determines an object of interest may be present. The camera manager 318 can use a neural network e.g., a Tensorflow model, to perform the object detection.

Based on the regions detected in the step 904, the camera manager 318 can classify each region proposal into one of several target classes (e.g., human, animal, car, etc.). In some embodiments, the camera manager applies a classification filter to the classes. For example, the camera manager 318 can include a filter that indicates a hierarchy of classes and filters according to the hierarchy of classes. For example, a top level class may be a vehicle class while the vehicle class is associated with a set of sub-classes, e.g., a truck class, a sedan class, a cross-over vehicle class, etc. For any region proposal classified as one of the sub-classes, based on the filter, the camera manager 318 can apply the top level class. For example, if a truck is identified by the camera manager 318, the camera manager 318 can assign the truck the vehicle class.

Finally, in the sub-step 908, the camera manager 318 can fine tune the region proposals of the classified regions of the sub-step 906 to and generate a bounding box for each region proposal. The bounding box may be a box that surrounds the proposal region and provides an indication of the classification of the proposal region. In some embodiments, the region proposals can be reduced from a first area as identified in step 904 to a second area. The camera manager 318 can generate a box and apply the box around the second area. The image analyzed in the sub-steps 904-908 can be presented to a user with the box overlaid such that information regarding the objects is presented to an operator. Examples of objects with overlay bounding boxes is provided in FIGS. 31-34.

Figure 10:
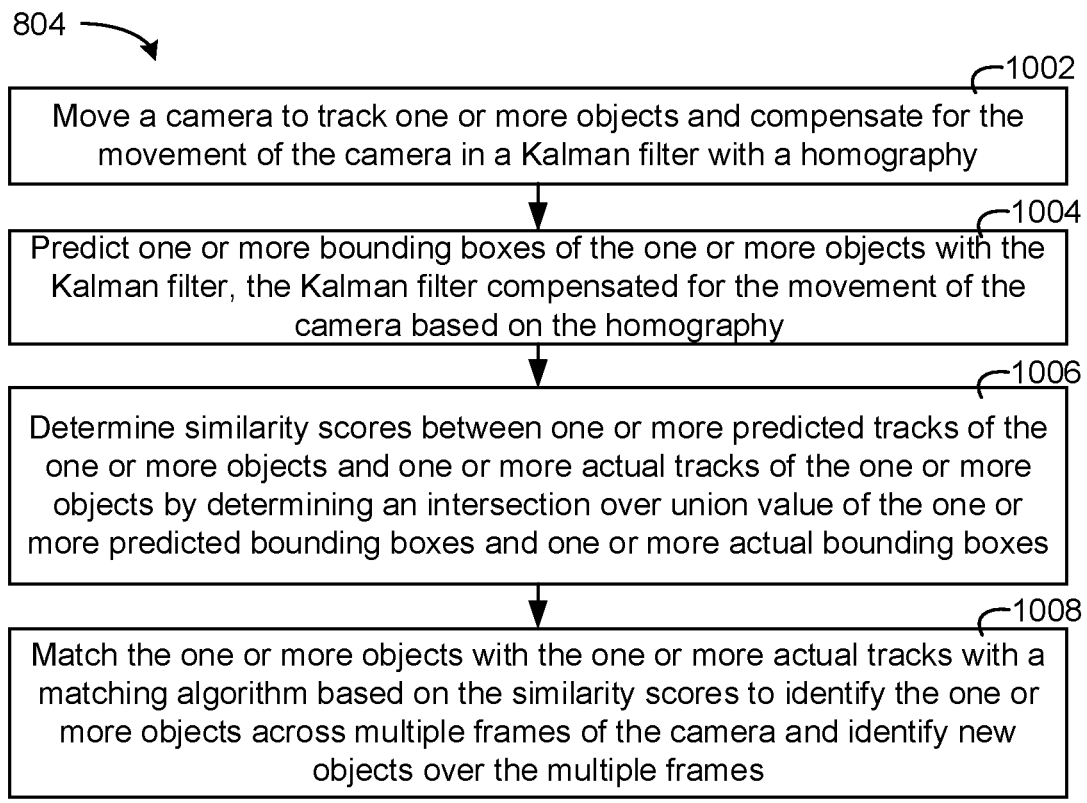
FIG. 10 is a flow diagram of a process illustrating the object tracking of the process of FIG. 8 that can be performed by the building radar-camera system of FIG. 3, according to an exemplary embodiment.

Referring now to FIG. 10, the step 804 is shown in greater detail as a process that the camera manager 318 can perform, according to an exemplary embodiment. The process can include multiple steps, i.e., the steps 1002-1008. The step 804 can track a detected object of the step 802. The step 804 can be the same as, or similar to, the process 500 as described with reference to FIGS. 5-6. While any computing device described herein can be configured to perform the step 802, e.g., the security system manager 302, the step 802 is described with reference to the camera manager 318.

In step 1002, the camera manager 318 can perform camera motion compensation using a homography. This can allow the Kalman filter to understand the position of the detected object even if the camera is moving. A homography is described in further detail in FIG. 12 and elsewhere herein. In some embodiments, the camera manager 318 can transform all points in an image when the camera is moving to a reference frame such that the Kalman filter operates according to a stable reference point. In some embodiments, the camera manager 318 adjusts parameters, e.g., internal states of the Kalman filter, to account for movement of the camera.

In step 1004, the camera manager 318 can predict an object bounding box using a Kalman filter. The prediction of the object bounding box may be future location for the bounding box based on a current location of the bounding box. This may be a prediction of the movement of the object represented by the bounding box. The prediction by the Kalman filter can be made based on one or multiple past known locations of the object (e.g., past bounding boxes). The Kalman filter can track one or multiple different objects, generating a predicted location for each. The prediction of the Kalman filter may not be affected by movement of the camera since internal states of the Kalman filter can be compensated for using movement of the camera with the homography as described in step 1002.

In step 1006, the camera manager 318 can determine a similarity between a predicted tracks of the object, e.g., the predicted locations of the bounding boxes, and actual tracks of the one or more objects, e.g., new bounding box locations representing an actual location of the objects within a subsequent image. The similarity can be determined with intersection by determining IoU values. For two bounding boxes, a predicted bounding box and an actual subsequently determined bounding box, the union may be the total area of the overlapping and non-overlapping portions of the bounding boxes summed together. The intersection may be the area of only the overlapping portions of the two bounding boxes. The IoU may be the intersection divided by the union. The higher the value of the IoU, the better the prediction of the Kalman filter and the higher the probability that the object of the predicted location is the same object as in the subsequent image. For example, an IoU over 0.5 may be considered to be a correct IoU or an IoU that confirms that the object of the prediction and the object of the subsequent image are the same object.

In step 1008, the camera manager 318 can match the objects and tracks using the similarity scores of the step 1006 with a matching algorithm. The matching can identify the objects across multiple frames and further identify any new objects (e.g., an object of a new frame that is not matched with any previous objects). The matching algorithm can be a marriage/Hungarian algorithm. In some embodiments, rather than, or in addition to, simply identify whether the IoU of the step 1006 is above a predefined amount, a matching algorithm can be used. This can allow for tracking of the objects through multiple frames even when the objects are partially occluded or disappear from the frames for a period of time.

Figure 11:
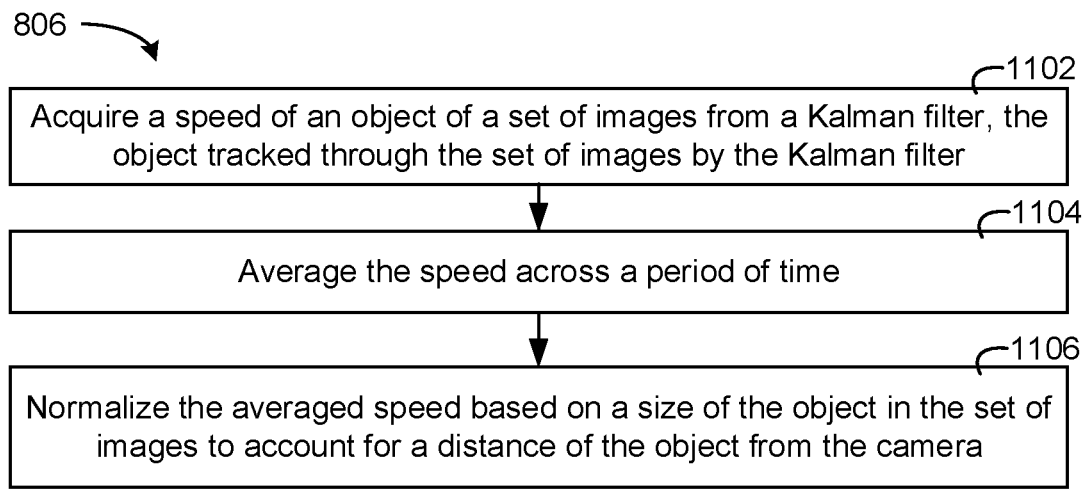
FIG. 11 is a flow diagram of a process illustrating the static track filtering of the process of FIG. 8, according to an exemplary embodiment.

Referring now to FIG. 11, the step 806 is shown in greater detail as a process that the camera manager 318 can perform, according to an exemplary embodiment. The process can include multiple steps, i.e., the steps 1102-1106. While any computing device described herein can be configured to perform the step 806, e.g., the security system manager 302, the step 806 is described with reference to the camera manager 318. In some embodiments, the step 806 is only performed for static objects, i.e., objects which are not changing in size. This is indicative that the object is not traveling towards the camera and is instead traveling perpendicular to the camera.

In step 1102, the camera manager 318 can acquire a speed of the detected object from an internal state of the Kalman filter. As described in FIGS. 5 and 10, the object can be tracked by the Kalman filter. The camera manager 318 can retrieve a predicted speed of the object from the Kalman filter for each frame of a sequence of frames analyzed by the camera manager 318. The values of the speed may not be affected by movement of the camera capturing the image. As previously described, a homography can be used to compensate for camera movement by adjusting internal parameters of the Kalman filter.

In step 1104, the speed can be collected over time and averaged in step 1104. The speed retrieved from the Kalman filter for each image of the sequence of images can be averaged to generate the average speed for the object. In step 1106, the camera manager 318 can normalize the average speed determined in the step 1104 based on the size of the detected object in step 1106. The speed may be relative to the size of the object since distant objects may move a fewer number of pixels a second that a closer object. In this regard, the average speed can be normalized to a pixel area of the object. The pixel area may be an average pixel area of the object over the sequence of images. In some embodiments, the normalization is based on a function that assigns an actual speed to the object based on the average speed of the step 1104 and the size of the object.

Figure 12:
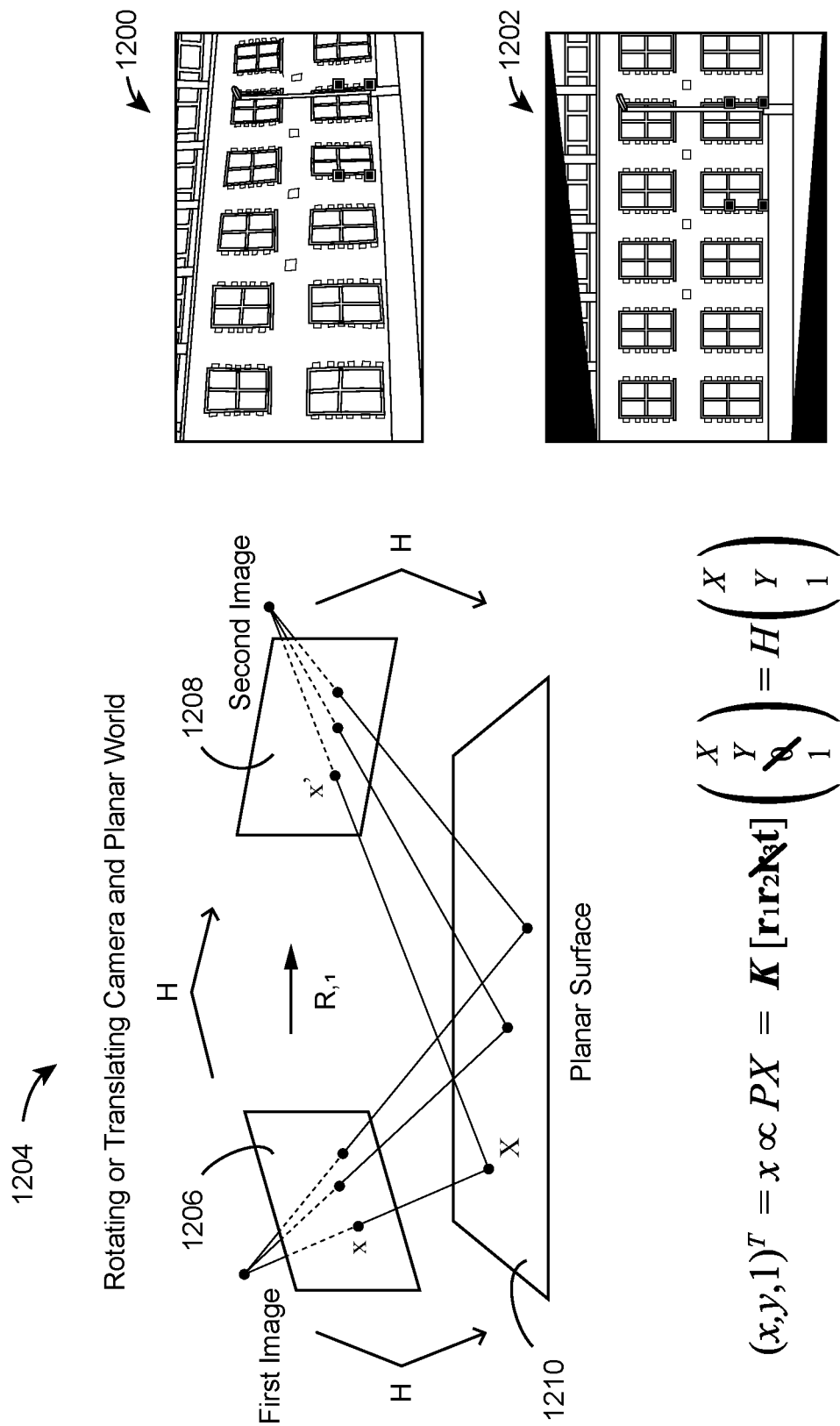
FIG. 12 is a diagram illustrating a homography that can be used by the building radar-camera system of FIG. 3 for translating points from a first plane to a second plane, according to an exemplary embodiment.

Referring now to FIG. 12, a drawing 1204 illustrating a homography that can be used to translate points from a first image to a second image is shown, according to an exemplary embodiment. In FIG. 12, three planes are shown, a first image plane 1206 (e.g., first camera or first camera position of the first camera), a second image plane 1208 (e.g., second camera of second camera position of the first camera), and a planar surface 1210 (e.g., the world plane). The points may exist on the planar surface 1210 and can be detected on the first image 1206 and the second image 1208.

The planar surface 1210 can be a surface surveyed by the radar system 304 and the points can be radar detections of objects determined by the radar system 304. The first image 1206 and the second image 1208 can be two images of the same camera, the camera having moved from a first position to a second position. In some embodiments, the first image 12067 and the second image 1208 are images of separate cameras surveying the same scene from different angles. Visual images 1200 and 1202 can correspond to the first image 1206 and the second image 1202. The visual image 1200 and 1202 illustrate a scene with points, while the points are the same, the points are at different pixel locations based on the angles from which the visual images 1200 and 1202 are captured.

Figure 13:
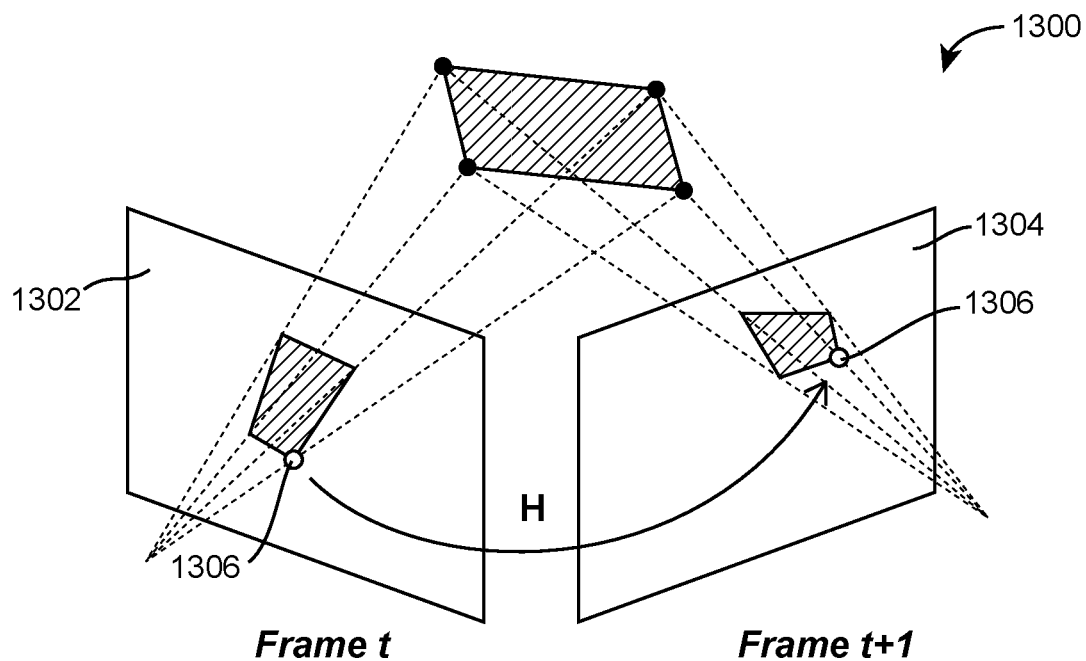
FIG. 13 is another diagram illustrating a homography that can be used by the building radar-camera system of FIG. 3 for translating a section of a first plane to a second plane, according to an exemplary embodiment.

A homography, H, may exist between the planar surface and the first image, the planar surface and the second image, and/or between the first image and the second image. The homography may be a matrix of values that can be used to translate points between first image 1206 and the second image 1208. A second homography can translate points between the image 1206 and the planar surface 12010. A third homography can translate points between the second image 1208 and the planar surface 1210. In some embodiments, the first image 1206 is a first position of a camera at a first time and the second image is a second image 1208 of the camera at a subsequent time. Therefore, the camera manager 318 can be configured to use a homography between the first image 1206 and the second image 1208 to translate the location of objects between the first image 1206 and the second image 1208 as the camera moves. FIG. 13 provides another example 1300 of a homography between multiple planes.

A homography may be defined as an invertible mapping h from $P^2$ to $P^2$ such that three points $x_1$, $x_2$, $x_3$ lie on the same line if and only if $h(x_1)$, $h(x_1)$, and $h(x_1)$ do. The theorem for a homography may be stated as: A mapping h: $P^2 \to P^2$ is a homography if and only if there exists a non-singular 3×3 matrix H such that for any point in $P^2$ represented by a vector X it is true that h(X)=HX. A homography can be defined as:

$$\begin{pmatrix} x'_1 \\ x'_2 \\ x'_3 \end{pmatrix} = \begin{bmatrix} h_{11} & h_{12} & h_{13} \\ h_{21} & h_{22} & h_{23} \\ h_{31} & h_{32} & h_{33} \end{bmatrix} \begin{pmatrix} x_1 \\ x_2 \\ x_3 \end{pmatrix} \text{ or } x' = Hx(\text{8 Degrees of freedom})$$

Referring now to FIG. 13, a schematic drawing 1300 illustrating another homography, H, is shown, according to an exemplary embodiment. In FIG. 13, two images 1302 and 1304 captured by a camera at two different points in time are shown. A point 1306 in the image 1302 can be translated to the frame 1304. While a single point is shown to be translated between the frames 1302 and 1306, and entire detection of an object, e.g., the shapes illustrated in the images 1302 and 1304 can be translated between the two images via the homography.

Figure 14:
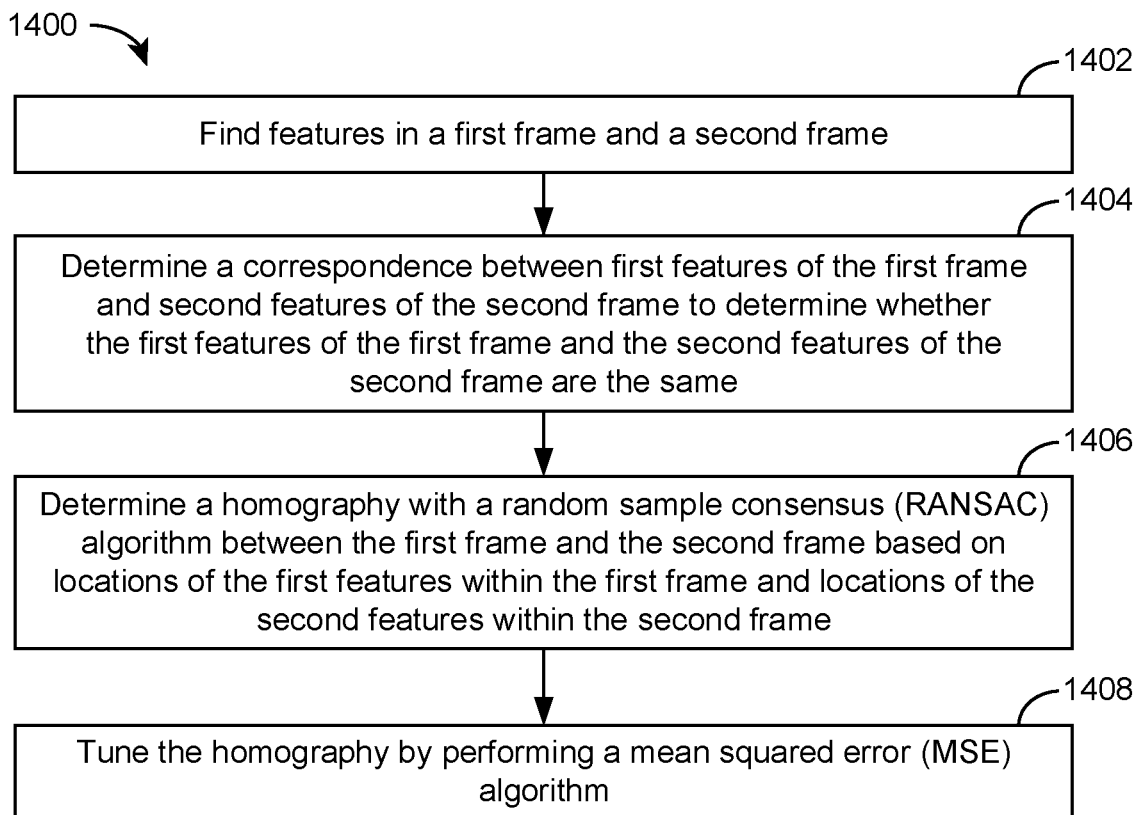
FIG. 14 is a process for determining the homography of FIGS. 12-13 that can be performed by the building radar-camera system of FIG. 3 for translating points of a first plane to a second plane, according to an exemplary embodiment.

Referring now to FIG. 14, a process 1400 is shown for estimating homographies that can be performed by the camera manager 318, according to an exemplary embodiment. The security system manager 302 can be configured to perform the process 1400. Furthermore, the camera manager 318 and/or the calibrator 320 can be configured to perform the process 1400. However, the process 1400 is described with reference to the calibrator 320. Multiple homographies can be estimated between consecutive frames of a video sequence captured by the camera 306 and/or 308 using feature correspondence between the frames. Then, the homographies can be concatenated to establish a set of homographies between each camera frame and a certain camera reference frame, $H_{part}$.

The number of homographies concatenated may be dependent on an image including a point to be translated and a target reference frame. For example, for four images, a first image, a second image, a third image, and a fourth image, there may exist three homographies, a first homography between the first image and the second image, a second holography between the second image and the third image, and a third holography between the third image and the fourth image. To translate from the fourth image to the first image, the first homography, the second homography, and the third homography can be concatenated and used for the translation. To translate from the third image to the first image, only the first and second homographies may be concatenated and used for the translation.

In step 1402, the calibrator 320 can find features in a first frame and a second frame. In some embodiments, rather than determining features in two frames, the calibrator 320 identifies features in more than two frames. The calibrator 320 can use an oriented FAST and rotated BRIEF (ORB) algorithm to detect the features. Furthermore, the calibrator 320 can use any algorithm to detect the features, e.g., neural networks, decision trees, Bayesian networks, etc.

In step 1404, the calibrator 320 can determine a correspondence between the features. The calibrator 320 can compare the features of the first frame and the features of the second frame to identify whether the features correspond. For example, the features of the first frame may identify a particular object, a vehicle, a stop sign, a building window, etc. The features of the second frame can be compared to the features of the first frame to identify whether the second frame also includes images of the vehicle, stop sign, building window, etc.

In step 1406, based on the correspondence between the features of the first frame and the second frame as identified in the step 1404, the calibrator 320 can find a homography, H, using random sample consensus (RANSAC) which may randomly select features of the first and second frames that correspond to determine the homography. The homography determined with RANSAC, in step 1408, can be fine tuned with a mean squared error (MSE) algorithm.

Figure 15:
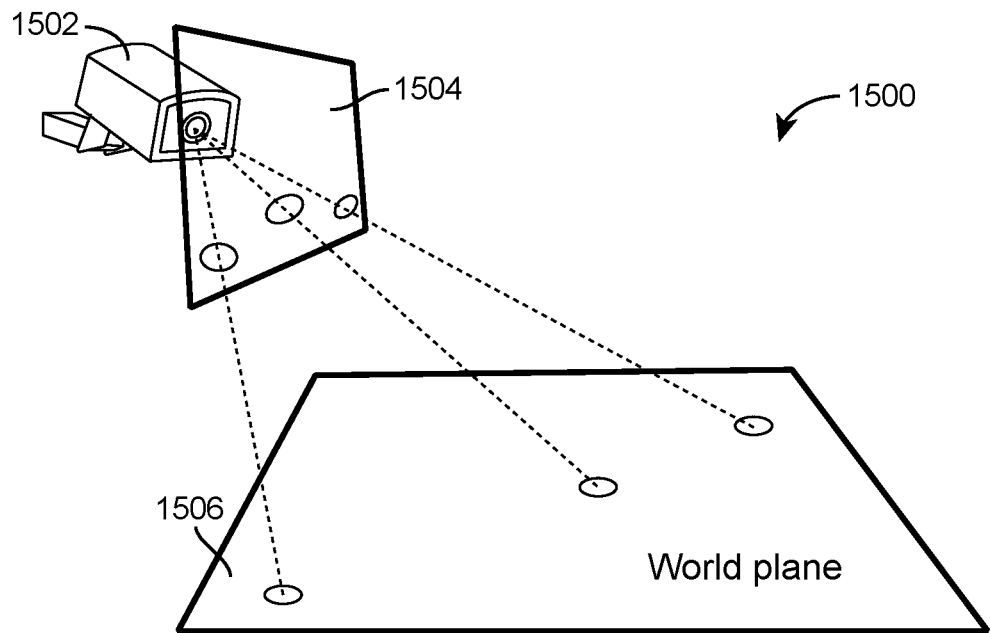
FIG. 15 is a diagram illustrating points translated between a camera plane and a world plane, the camera plane being a plane for a camera and the world plane being a plane for a radar system, according to an exemplary embodiment.

Referring now to FIG. 15, an illustration 1500 of points in a camera plane 1504 of a camera 1502 and a world plane 1506 is shown, according to an exemplary embodiment. A standard calibration may not work well for mapping between the camera plane 1504 and the world plane 1506, e.g., mapping angles to pixels. A standard calibration may not be accurate enough and may fail for an object that is close to a camera. In view of these shortcomings, the calibrator 320 can be configured to determine a homography between a unit-sphere for the camera and a world plane; this is described in further detail in FIGS. 16-17B.

Figure 16:
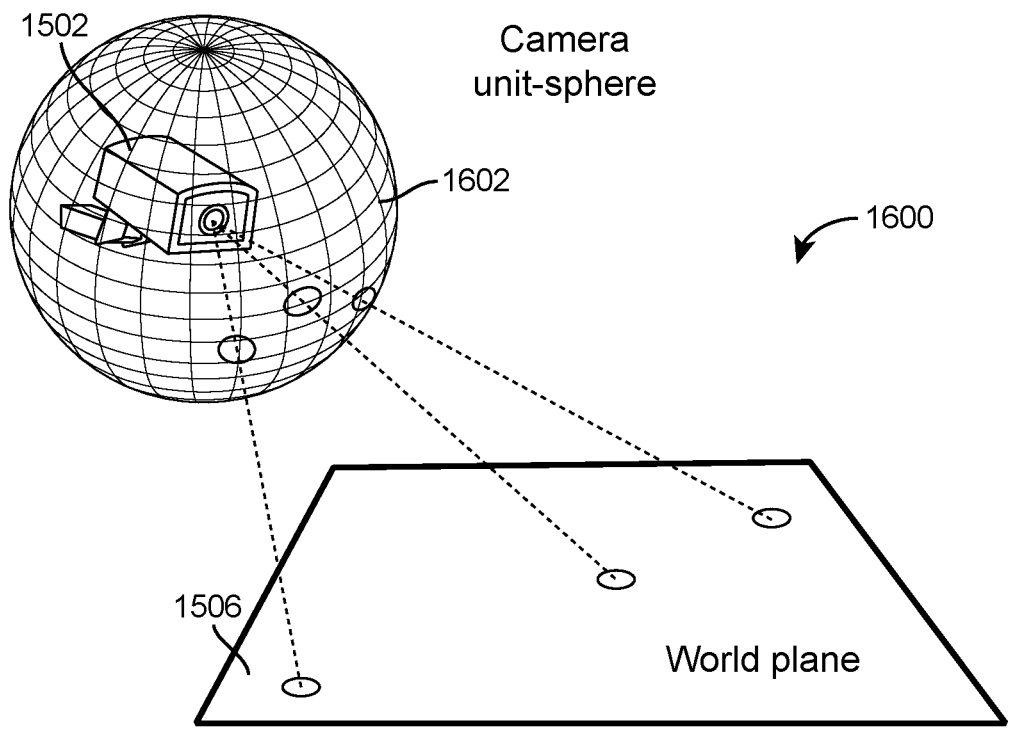
FIG. 16 is a diagram illustrating a translation of points between a camera unit-sphere and a world plane, the camera unit-sphere being a modeling consideration for the camera based on panning and tilting of the camera and the world plane being the plane for the radar system, according to an exemplary embodiment.
Figure 17A:
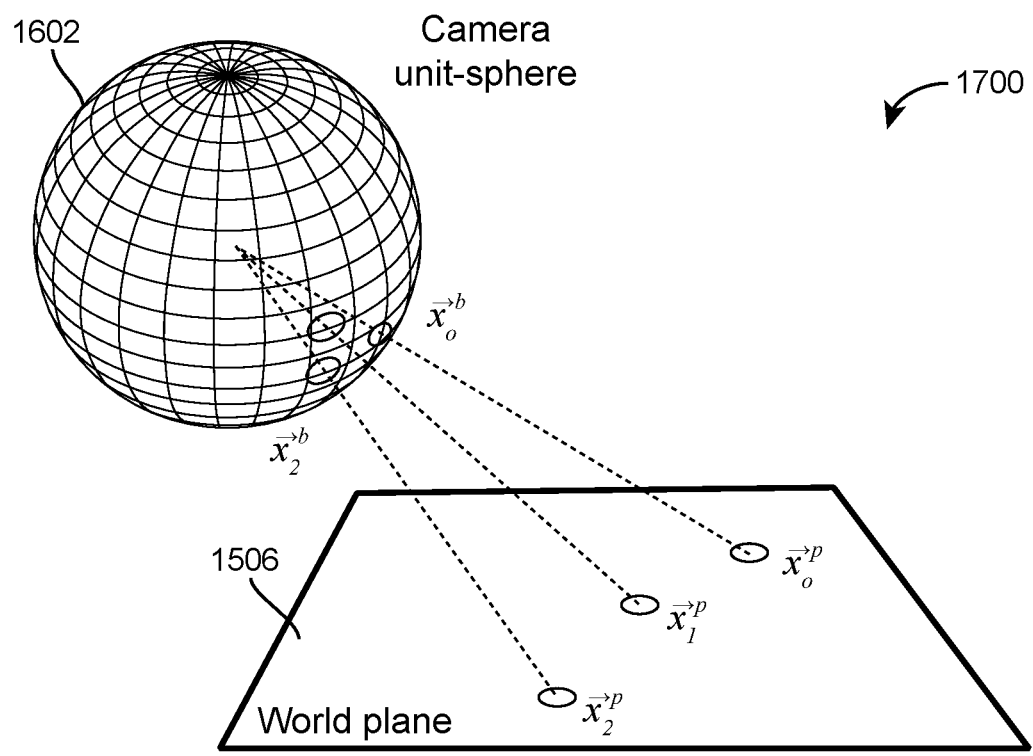
FIG. 17A is a diagram illustrating a determination of a sphere-to-plane homography for translating between the unit-sphere and the world plane, according to an exemplary embodiment.

Referring now to FIGS. 16-17A, illustrations 1600-1700 are shown exemplifying the homography that the calibrator 320 can be configured to determine to map points between a unit-sphere 1602 and a world plane 1506, according to an exemplary embodiment. The calibrator 320 can gather a set of points (e.g., between 6-10 points) to generate the mapping between the unit-sphere 1602 and the world plane 1506. Because the camera 1502 may rotate, rather than modeling the camera plane as a flat plane, e.g., the camera plane 1504, the camera plane may be better modeled as the unit-sphere 1602 since the camera can pan and zoom.

The calibrator 320 can be configured to determine the sphere-to-plane homography using non-convex optimization. This may allow the calibrator 320 to accurately map between visual tracks of the camera 1502 and corresponding world locations. The calibrator 320 can use the equation below including two terms to determine the sphere-to-plane homography:

$$\min_{A \in \mathbb{R}_{3\times 3}} \sum_{i=0}^{n} \left\| A\vec{x}_i^p - \vec{x}_i^b \right\|_b^2 + \lambda \left\| A^{-1}\vec{x}_i^b - \vec{x}_i^p \right\|_p^2$$

where $\| \ \|_b$ is the geodesics distance of points on the unit sphere, $\| \ \|_p$ is the distance on the plane, A is a three by three matrix of real numbers (e.g., the sphere-to-plane homography), $\vec{x}_i^p$ is a point in the world plane 1506, and $\vec{x}_i^b$ is a point on the sphere 1602. The calibrator 320 can be configured to utilize a tensorflow optimization tool to determine values for the sphere-to-plane homography. The values can be selected such that the geodesics distance on the sphere and the plane distance are minimized. The equation above can sum the geodesics distances and plane distances of a set of points. The optimization of the above equation selects a sphere-to-plane homography, A, that minimizes the sum.

The summation of the above equation can be understood, for a particular value of i, corresponding to a particular point ($\vec{x}_i^b$) on the sphere 1602 and a corresponding point ($\vec{x}_i^p$) on the world plane 1506, as a sum of a geodesics distance between the point in the world plane 1506 translated onto the sphere 1602 ($A\vec{x}_i^p$) and the corresponding point on the sphere 1602 ($\vec{x}_i^b$). The geodesics distance would optimally be zero, i.e., the homography can translate with no error. However, because the homography is not perfect, the optimization can select values such that error in translation is minimized. The equation further takes into account the translation from the sphere 1602 to the world plane 1506, i.e., the point on the sphere 1602 ($\vec{x}_i^b$) translated on the sphere 1506 with an inverse of the homography ($A^{-1}\vec{x}_i^b$) and the corresponding point on the world plane 1506 ($\vec{x}_i^p$). Again, optimally, the distance would be zero, i.e., the homography can translate with no error.

Figure 17B:
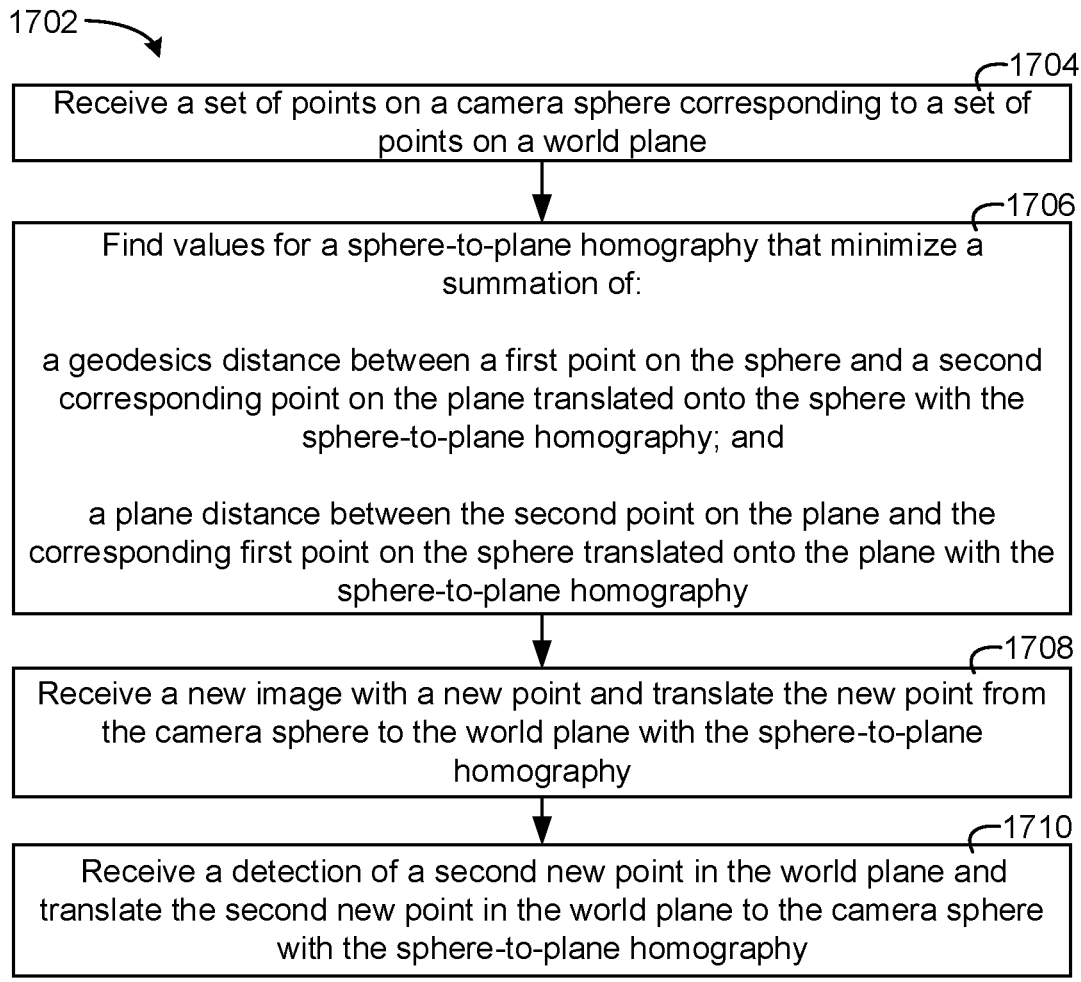
FIG. 17B is a flow diagram of a process for determining the sphere-to-plane homography with an optimization based on a correspondence of points on the unit-sphere to points on the world plane that can be performed by the building radar-camera system of FIG. 3, according to an exemplary embodiment.

Referring now to FIG. 17B, a process 1702 is shown for determining a sphere-to-plane homography that can be performed by the calibrator 320, according to an exemplary embodiment. The security system manager 302 can be configured to perform the process 1702. Furthermore, the camera manager 318 and/or the calibrator 320 can be configured to perform the process 1400. While any computing system or device as described herein can be configured to perform he process 1702, the process 1702 is described with reference to the calibrator 320, the camera manager 318 and/or the radar system manager 316.

In step 1704, the calibrator 320 receives a set of points on a camera sphere corresponding to a set of points on a world plane. The set of points on the camera sphere may be pixel coordinates each associated with a world plane radar coordinate. The points of the camera sphere and the world plane can be associated such that a point on the camera sphere is the same point on the world plane, i.e., if a camera views a point with a particular pixel coordinate, the point viewed by the camera has a corresponding world plane coordinate. The correlation between camera and world plane coordinates can be predefined by a user. Furthermore, the correspondence between camera points and world points can be determined via the process of FIG. 20A, the process of FIG. 21A, and/or the process of FIG. 23.

In step 1706, the calibrator 320 can perform an optimization to determine a sphere-to-plane homography for translating between points of a camera sphere and a world plane. The calibrator 320 can minimize the below equation to identify a 3×3 matrix, A, of real numbers. The optimization may select values for the matrix that are optimal, e.g., values associated with a small or minimal amount of error.

$$\sum_{i=0}^{n}\left\|A\vec{x}_i^p - \vec{x}_i^b\right\|_b^2 + \lambda\left\|A^{-1}\vec{x}_i^b - \vec{x}_i^p\right\|_p^2$$

Minimizing the above equation may result in a minimization of a summation of distance errors for all of the points of the step 1704. The distance errors may be based on both a geodesics distance on the sphere and a plane distance on the world plane. The geodesics distance may be a distance between two sphere points, an original sphere point and a corresponding point on the world plane translated onto the sphere with the sphere-to-plane homography. Ideally, the geodesics distance would be zero. However, due to error, the geodesics distance will not be zero and thus the optimization attempts to minimize the geodesics distance, thus minimizing the error.

Furthermore, the summation includes a plane distance which is based on the point on the sphere translated onto the plane with the sphere-to-plane homography and the corresponding point on the world plane. Again, ideally, the plane distance would be zero but is not due to error. Thus, the optimization also takes into account error in the sphere-to-plane homography when translating from the sphere to the plane and attempts to minimize the error.

The resulting sphere-to-plane homography of the step 1706 can be stored by the calibrator 320. Furthermore, the calibrator 320 may provide the sphere-to-plane homograph to the camera manager 318 for managing and analyzing images received from the security cameras 306 and 308 and/or the radar system 304. In step 1708, the camera manager 318 receives a new image with a new point. The image may be received by the camera manager 318 from one of the cameras 306 and 308. The camera manager 318 may identify the point via an image processing algorithm, e.g., the camera manager 318 may identify that the new point corresponds to an object of interest, e.g., a person. The camera manager 318 can determine a location of the point on the world plane with the sphere-to-plane homography determined in the step 1706.

In step 1710, the radar system manager 316 can receive a detection of a second new point in the world plane. The radar system 304 can identify an object but the object may need to be correlated to an object classified by the camera manager 318 via images received from a camera. To perform the correlation, radar system manager 316 and/or the camera manager 318 can use an inverse of the sphere-to-plane homography (e.g., an inverse of the matrix representing the sphere-to-plane homograph).

Figure 18:
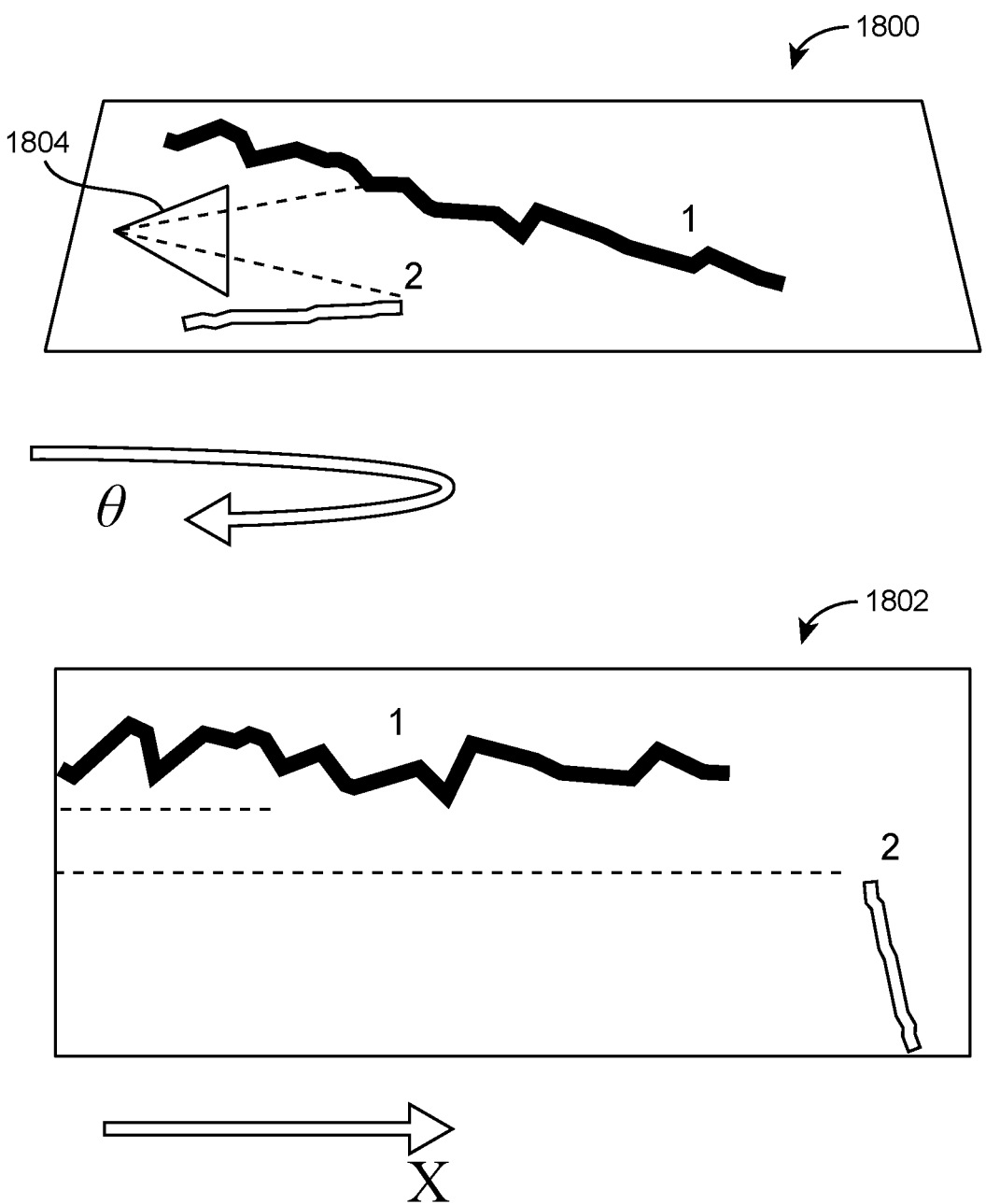
FIG. 18 is a diagram illustrating tracks of two objects determined by a camera of the building radar-camera system of FIG. 3 and determined by the radar system of the building radar-camera system of FIG. 3, according to an exemplary embodiment.

Referring now to FIG. 18, radar tracks 1800 and camera tracks 1802 are shown, according to an exemplary embodiment. The camera tracks 1802 may be object tracks for a camera space (e.g., a screen space) that is based on images captured by cameras 306 and/or 308. The radar tracks 1800 may be object tracks for a radar space (e.g., a world space) captured by the radar system 304 (or captured by the cameras 306 and/or 308 and transformed into the world space). The location of a camera 1804 which captures the camera tracks 1802 is shown in the radar tracks 1800. Since a radar object detection may be in world coordinates, e.g., latitude and longitude, angle and distance from the radar, etc. it may not directly match up with camera objects which are in pixels (Px, Py) that depend on camera pan, tilt, or zoom.

However, the manager 302 can be configured to map between the two spaces so that a detection by radar system 304 can be used to control a security camera. For example, the camera manager 318 could use the sphere-to-plane homography determined in the process of FIG. 17B to translate points between the twos planes. The camera may not be calibrated, i.e., internal and/or external parameters may be unknown. The manager 302 can make multiple modeling assumptions to determine a correspondence between radar and camera tracks. The manager 302 may assume that world geometry is unknown and assumed to be planar and that the camera location is known and is given in radar coordinates (e.g., the camera may include a global positioning system (GPS) on the camera or is provided by an installation technician).

Figure 19:
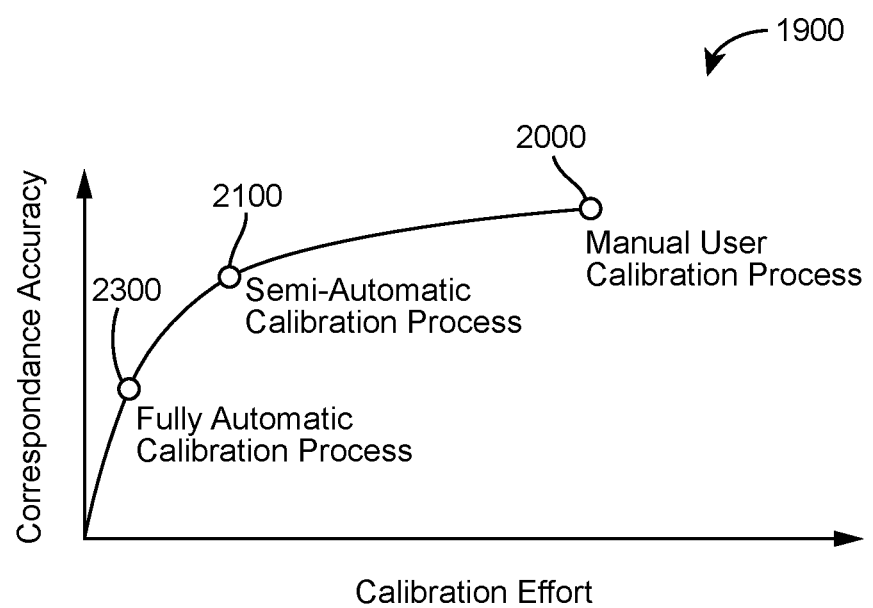
FIG. 19 is a chart illustrating a correspondence accuracy level for determining a correspondence between the tracks of the radar system with the tracks of the camera system for various calibration processes including a manual user calibration (illustrated in FIGS. 20A-20B), a semi-automatic calibration process (illustrated in FIGS. 21A-21B), and a fully automatic, process (illustrated in FIG. 23), according to an exemplary embodiment.

Referring now to FIG. 19, a chart 1900 is shown for illustrating three calibration processes and the resulting radar-camera correspondence accuracy for each, according to an exemplary embodiment. The processes compared in the chart 1900 illustrate multiple external camera calibration processes. A manual user calibration process 2000 is shown to require the most calibration effort but produce the highest correspondence accuracy between the radar detections and the camera detections. The manual user calibration process 2000 is described in greater detail in FIG. 20A. A semi-automatic calibration process 2100 is described in greater detail in FIGS. 21-22 while the fully automatic calibration process 2300 is described in greater detail in FIG. 23. For every zoom level, there may be a correlation between a change in pixels and a pan and/or change tilt in angles. A manual calibration may not be practical for every zoom level.

Figure 20A:
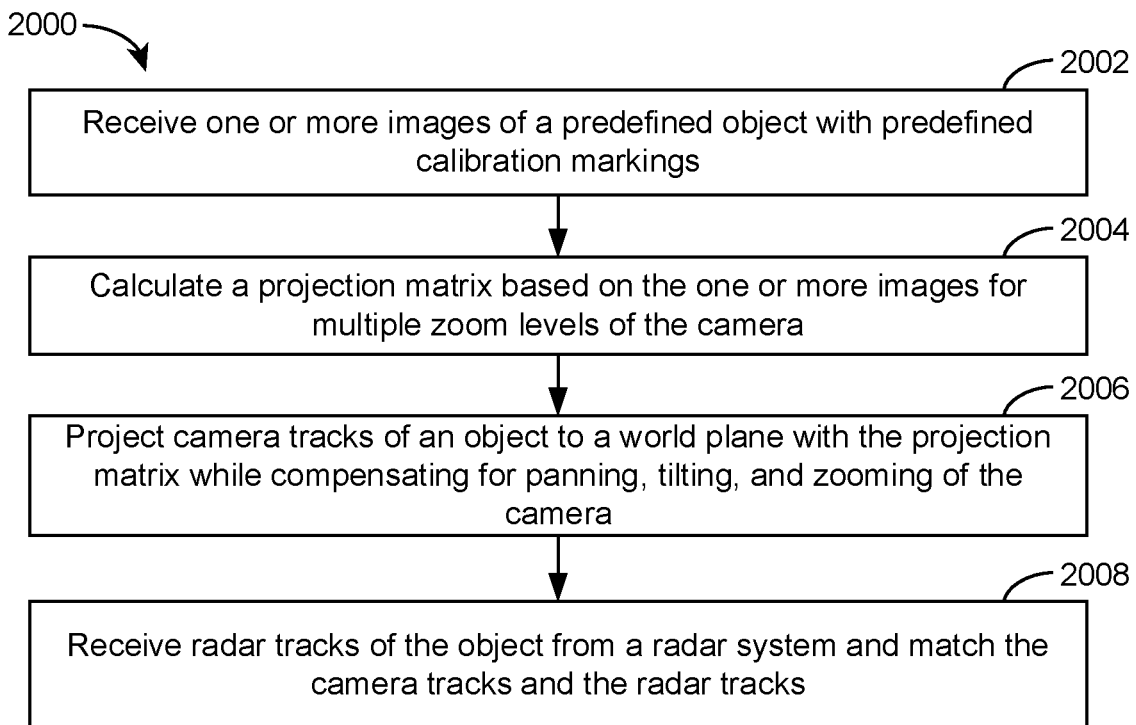
FIG. 20A is a flow diagram of the manual user calibration process of FIG. 19 that can be performed by the building radar-camera system of FIG. 3, according to an exemplary embodiment.

Referring now to FIG. 20A, the manual user calibration process 2000 is shown in greater detail for determining a correspondence between radar detections and camera detections, according to an exemplary embodiment. The security system manager 302 can be configured to perform the process 2000. Furthermore, the camera manager 318 and/or the calibrator 320 can be configured to perform the process 2000. While any computing device described herein can be configured to perform the process 2000, the process 2000 is described with reference to the calibrator 320.

Figure 20B:
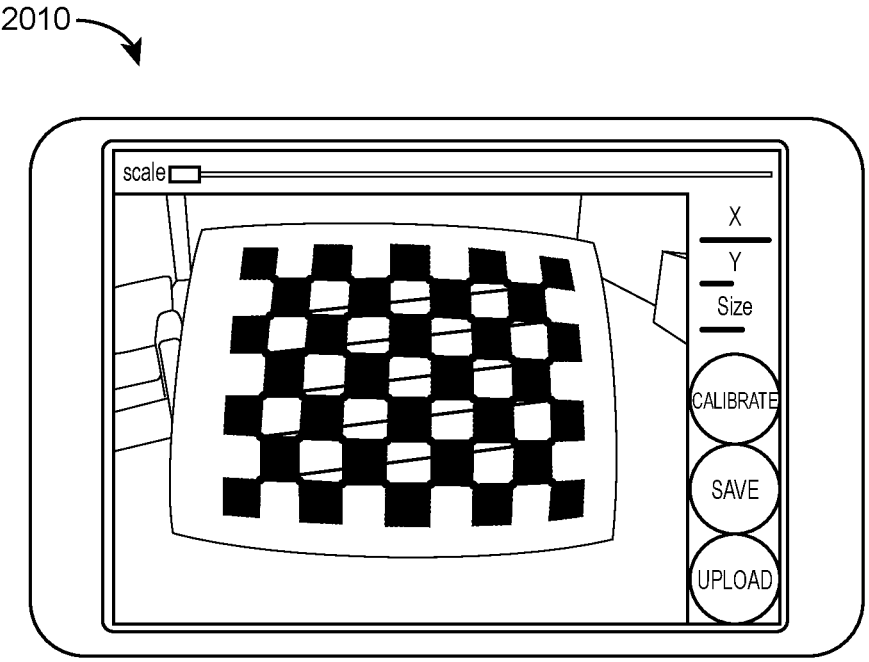
FIG. 20B is an image captured by a camera calibrated with the manual user calibration of FIG. 20A, the image being an image of a calibration pattern, according to an exemplary embodiment.

In step 2002, the calibrator 320 can receive one or more images of a predefined object with predefined calibration markings for calibrating the camera 306 and/or 308. Each of the one or more images can be captured at multiple zoom levels. The image may be image 2010 as shown in FIG. 20B. The predefined object of the image 2010 is a chess board with squares of predefined distances. The size of each square and the distance between each square may be known.

In step 2004, the calibrator 320 can calculate a projection matrix P for each zoom-level of the camera 306 and/or 308. The projection matrix can be determined based on pre-defined characteristics of the calibration markings, e.g., size, distance between markings, shape, etc. The projection matrix may be a mapping between a two dimensional image point and a three dimensional world point, $$x = PX$$

$$\begin{bmatrix} X \\ Y \\ Z \end{bmatrix} = \begin{bmatrix} p_1 & p_2 & p_3 & p_4 \\ p_5 & p_6 & p_7 & p_8 \\ p_9 & p_{10} & p_{11} & p_{12} \end{bmatrix} \begin{bmatrix} X \\ Y \\ Z \\ 1 \end{bmatrix}$$

where x is the two dimensional world point, P is the projection matrix, and X is the three dimensional world point. The process 2000 may not be practical for every zoom level. For example, it may be time consuming to perform a calibration for every zoom level. Furthermore, some zooms of cameras may be continuous. In these instances, projection matrices for a predefined representative set of zoom levels can be determined.

In step 2006, the calibrator 320 can project camera tracks of an object to a world plane with the projection matrix (or matrices if the camera changes zoom) considering the motion abilities of the camera. The motion capabilities can be accounted for by first translating all detections of multiple frames to a first frame via homographies and then translating between the first frame and the world plane. This can account for any movement that the camera performs to track the object.

In step 2008, the calibrator 320 receive radar detections of the object from the radar system 304 and can match between the translated camera detections of the world plane and the detections of the radar system in the world plane. In some embodiments, an association algorithm, e.g., a Hungarian algorithm is used to determine which points of the camera track correspond to which points of the radar track.

Figure 21A:
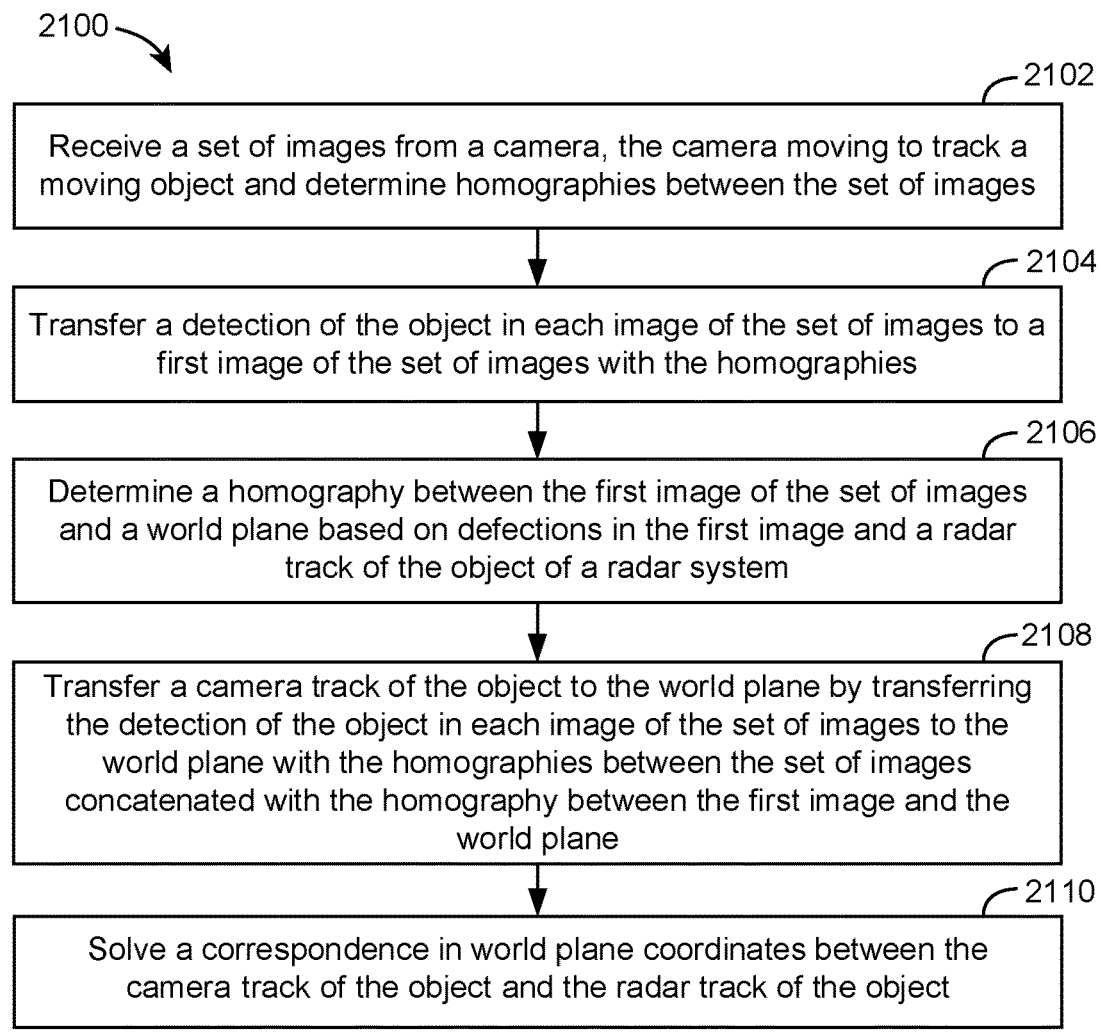
FIG. 21A is a flow diagram of the semi-automatic calibration process of FIG. 19 that can be performed by the building radar-camera system of FIG. 3, according to an exemplary embodiment.
Figure 21B:
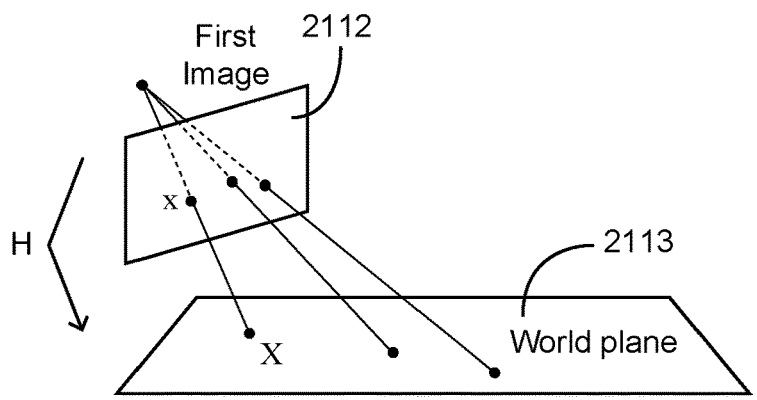
FIG. 21B is an example of points on a first image of a camera plane and corresponding points on a world plane illustrating the process of FIG. 21A, according to an exemplary embodiment.
Figure 22:
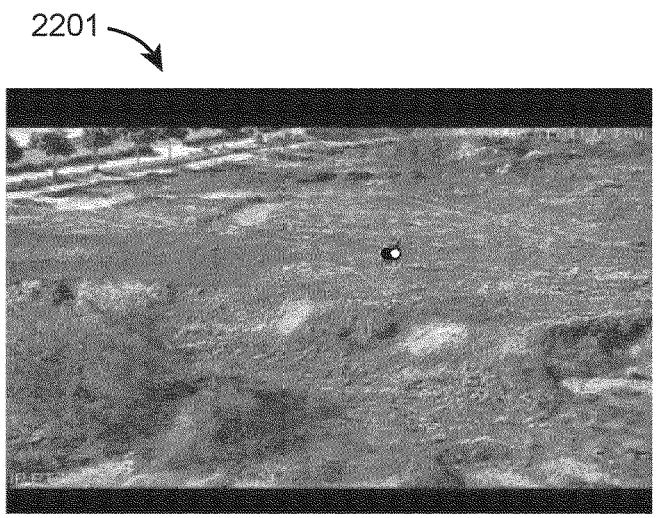
FIG. 22 is a diagram of camera images and corresponding radar tracking for performing the fully automatic calibration process of FIG. 21A, according to an exemplary embodiment.
Figure 22:
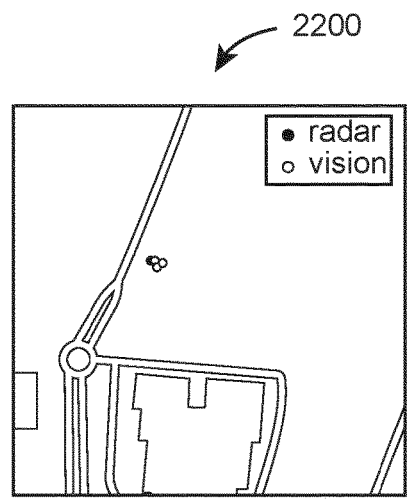
Figure 22:
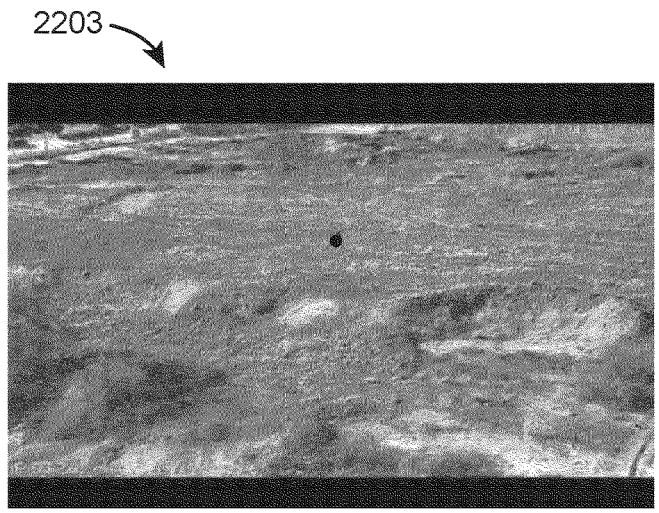
Figure 22:
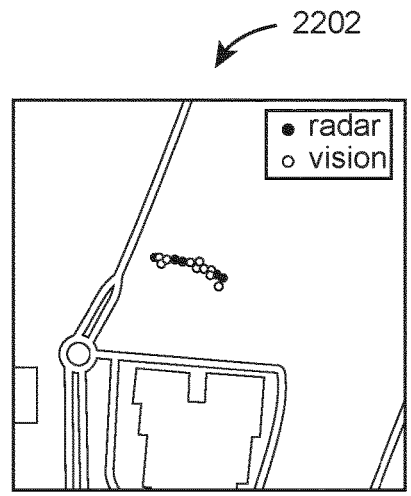
Figure 22:
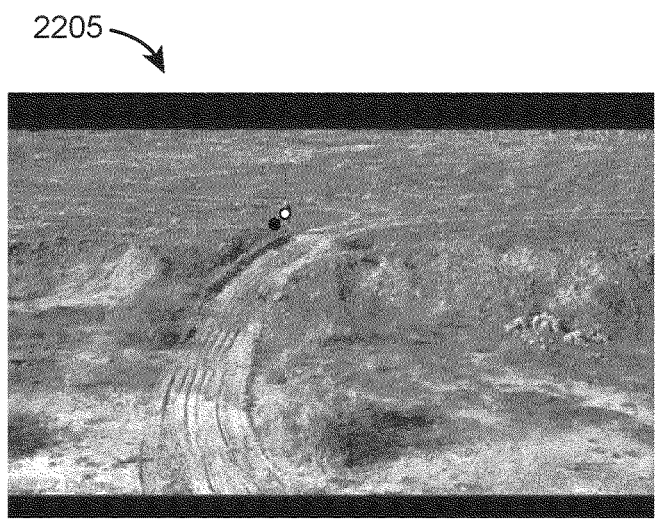
Figure 22:
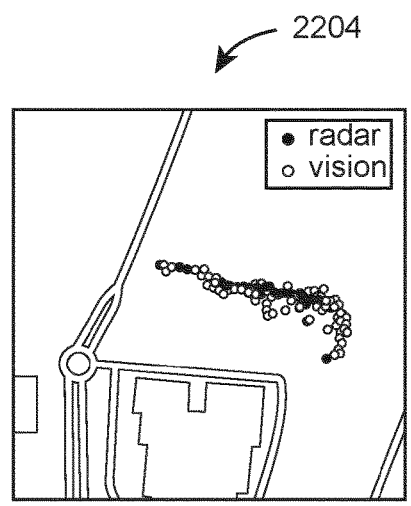

Referring now generally to FIGS. 21A-22, the semi-automatic calibration process 2100 is shown, according to an exemplary embodiment. With the calibration of FIGS. 21A-22, a camera scene can be used to semi-automatically calibrate a camera and a radar system via a single object walking in a semi-planar world. The calibrator 320 can receive the moving objects location from the radar system 304 (e.g., the world space) and can also receive a corresponding detection of the moving object from the camera 306 and/or 308 (e.g., in the camera space). Based on the locations in the radar world space and the camera detection in the camera world space, the calibrator 320 can be configured to find a mapping between the camera space and the world space.

Referring more particularly to FIG. 21A, the process 2100 is shown in greater detail, according to an exemplary embodiment. The security system manager 302 can be configured to perform the process 2000. Furthermore, the camera manager 318 and/or the calibrator 320 can be configured to perform the process 2000. While any computing device described herein can be configured to perform the process 2000, the process 2000 is described with reference to the calibrator 320. The process 2100 can be performed for the cameras 306 and/or 308 and radar system 304 both tracking a moving object, an example of the tracking data of both a camera and the radar system 304 is shown in FIG. 22.

In step 2102, the calibrator 320 can receive a set of images from a camera, the camera moving to track the moving object and can determine homographies between images as the camera moves to track the moving object. The set of images may be frames of a video captured by the camera. The calibrator 320 may determine the homographies between the images by analyzing each image to classify the object and then identify the homography according to the location of the classified object in each image. The determination of the homography can be the same as, or similar to, the determination of the homography described with reference to FIG. 14.

In step 2104, the calibrator 320 can transfer all detections to a first image 2112 (illustrated in FIG. 21B) via the homographies determined in the step 2102. In this regard, the movement of the camera to track the object is compensated for. The homographies can be concatenated to transfer the object from each image of the set of images receive din the step 2102 to the first image 2112.

In step 2106, the calibrator 320 can determine a homography between the first image 2112 and the world plane 2113, the world being the coordinate system of the radar system 304. In some embodiments, the calibrator 320 receives radar data from the radar system 304, the radar data indicating the location in the world plane of the object corresponding to each detection of the object in the frames of the step 2102. The calibrator 320 can determine the homography as described with reference to FIGS. 12-14 and/or FIGS. 17A-17B.

In step 2108, the calibrator 320 can transfer detections using concatenated homographies of the step 2104 and the homography between the first image 2112 and the world plane 2113 of the step 2106 to the world coordinates. The calibrator 320 can first translate points of the set of images to the first image 2112 with the homographies determined in the step 2106 and then transfer detections in the first image 2112 to the world plane 2113 using the homography of step 2106.

In step 2110, the calibrator 320 can determine the correspondence between received radar tracks in world coordinates. The calibrator 320 can determine the correspondence based on the coordinates of the radar system 304 and the transferred detections of step 2108 of the camera. The correspondence can be determined via a matching algorithm, e.g., a Hungarian algorithm. The result of the correspondence can be a pairing between detections of the camera and detections of the radar system 304.

Referring now to FIG. 22 three images of a camera and detections of a radar system are shown illustrating the calibration process 2100 of FIG. 21A, according to an exemplary embodiment. The camera image, images 2201, 2203, and 2205 may be an images captured by one of the cameras 306 and/or 308 over time to track a moving object. The camera manager 318 can control each the camera capturing the images shown in images 2201, 2203, and 2205 to track the moving object. A world coordinate system of images 2200, 2202, and 2204 illustrate detections of the radar system 304. In FIG. 22, the open circles indicate the tracking by the camera while the filled circles indicate the tracking by the radar system 304. As shown in FIG. 22, the tracking of the radar system 304 is transferred into the images 2201, 2203, and 2205 and similarly, the detections of the camera are transferred into the world coordinates in the images 2200, 2202, and 2204. The translation can be performed according to the process 2100 with the homographies determined in the process 2100.

Figure 23:
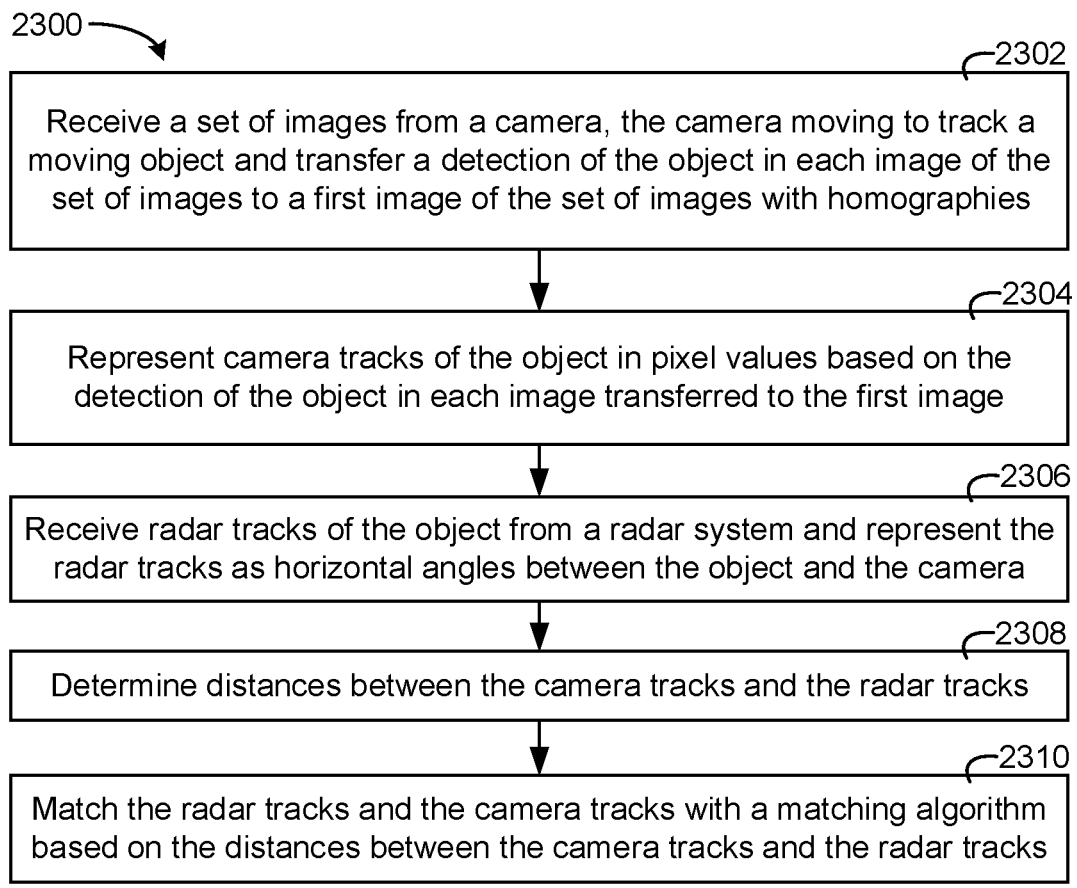
FIG. 23 is a flow diagram of the fully automatic calibration process of FIG. 21 that can be performed by the building radar-camera system of FIG. 3, according to an exemplary embodiment.

Referring again to FIG. 18, the x-axis in an image space is shown to be time correlated with an angle in a world space. The relationship can be used in the fully automatic calibration process 2300 of FIG. 23. Referring now to FIG. 23, the fully automatic calibration process 2300 is shown, according to an exemplary embodiment. The process 2300 can be performed by the calibrator 320. The security system manager 302 can be configured to perform the process 2300. Furthermore, the camera manager 318 and/or the calibrator 320 can be configured to perform the process 2300. While any computing device described herein can be configured to perform the process 2300, the process 2300 is described with reference to the calibrator 320.

In step 2302, the calibrator 320 can receive a set of images from a camera and transfer all object detections of a sequence of received image to a first image of the sequence using one or more homographies. In some embodiments, the calibrator 320 can determine the homographies and then translate the points to the first image. The step 2302 may be the same as, or similar to the steps 2102-2104.

In step 2304, the calibrator 320 can represent camera tracks of the detections transferred to the first image as pixel values, the pixel values corresponding to an angle from the object to the camera. In step 2306, the calibrator 320 can receive radar tracks of the object from the radar system 304 and represent the radar track received from the radar system 304 as a horizontal angle to the camera. In some embodiments, the radar system 304 determines the detections of the radar tracks as coordinate values which, based on a location of the camera, can be translated into horizontal angles to the camera. In some embodiments, the radar system 304 determined the track in horizontal angles to the radar system 304 and includes the difference in angles between the radar system 304 and the camera system in the below equation.

In step 2308, the calibrator 320 can calculate a distance between the radar tracks of the step 2308 and the camera tracks of the step 2304. The calibrator 320 can use the equation below to determine the distance:

$$\text{Min}_{(a,b)} \|\text{Radar} - a*\text{Camera} - b\|2$$

where a is the field of view of the camera divided by the pixel number of the camera and b is the difference between the camera azimuth and the radar azimuth. Radar is the radar angle while Camera is the horizontal pixel number. Accordingly, the above equation can convert the pixel number into a corresponding angle (a*Camera), find the difference in angle between the radar detection and the translated camera detection (Radar−a*Camera) and compensate for an angle difference between the radar system determining the radar tracks and the camera system (−b). The result of the above equation may be the shortest distance between the radar track and the camera track.

In step 2310, the calibrator 320 can match the camera and radar tracks. The calibrator 320 can use a marriage/Hungarian algorithm to perform the track matching which can be based on the distances between the radar tracks and the camera tracks. In some embodiments, the step 2308 determines a distance between each radar detection of the radar tracks and each camera detection of the camera tracks and uses the matching algorithm to pair the detections of the radar tracks and the camera tracks based on all of the distances.

Figure 24:
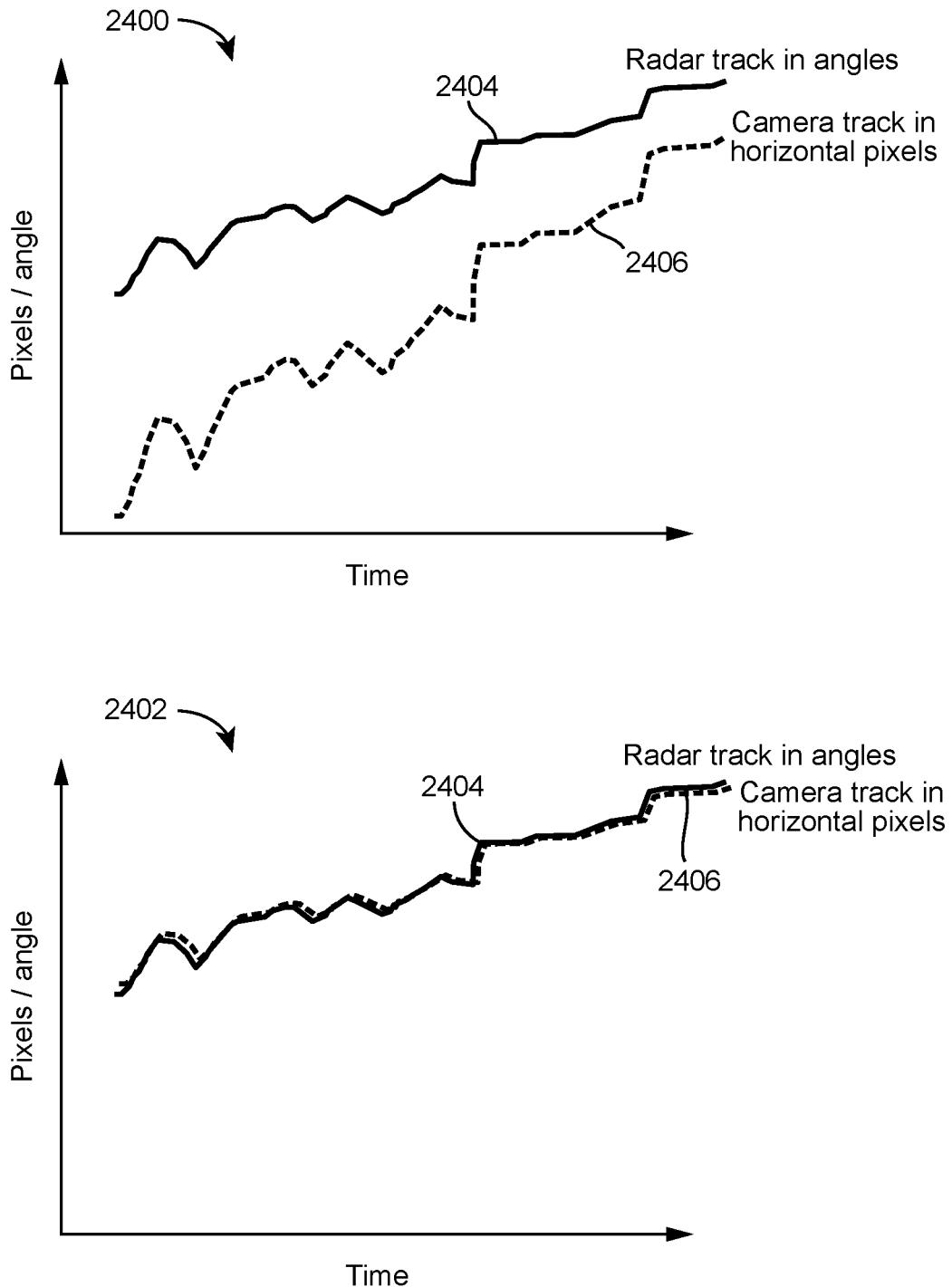
FIG. 24 is a set of charts illustrating matching a radar track in angles to a camera track in horizontal pixels illustrating the fully automatic calibration process of FIG. 21, according to an exemplary embodiment.

Referring now to FIG. 24, graphs 2400 and 2402 are shown illustrating the track matching of the process 2300 of FIG. 23, specifically, determining the distance between the radar tracks and the camera tracks, according to an exemplary embodiment. The graph 2400 can illustrate the pixel and/or angle tracks of the moving object determined for the camera and/or the radar system in steps 2304 and 2306. The graph 2402 illustrates the matched tracks. In graphs 2400-2402, marker 2404 represents the radar track in angles while the marker 2406 represents the camera track in horizontal pixels. The matching can be performed by determining a distance between the radar tracks and camera tracks with the equation above.

Figure 25A:
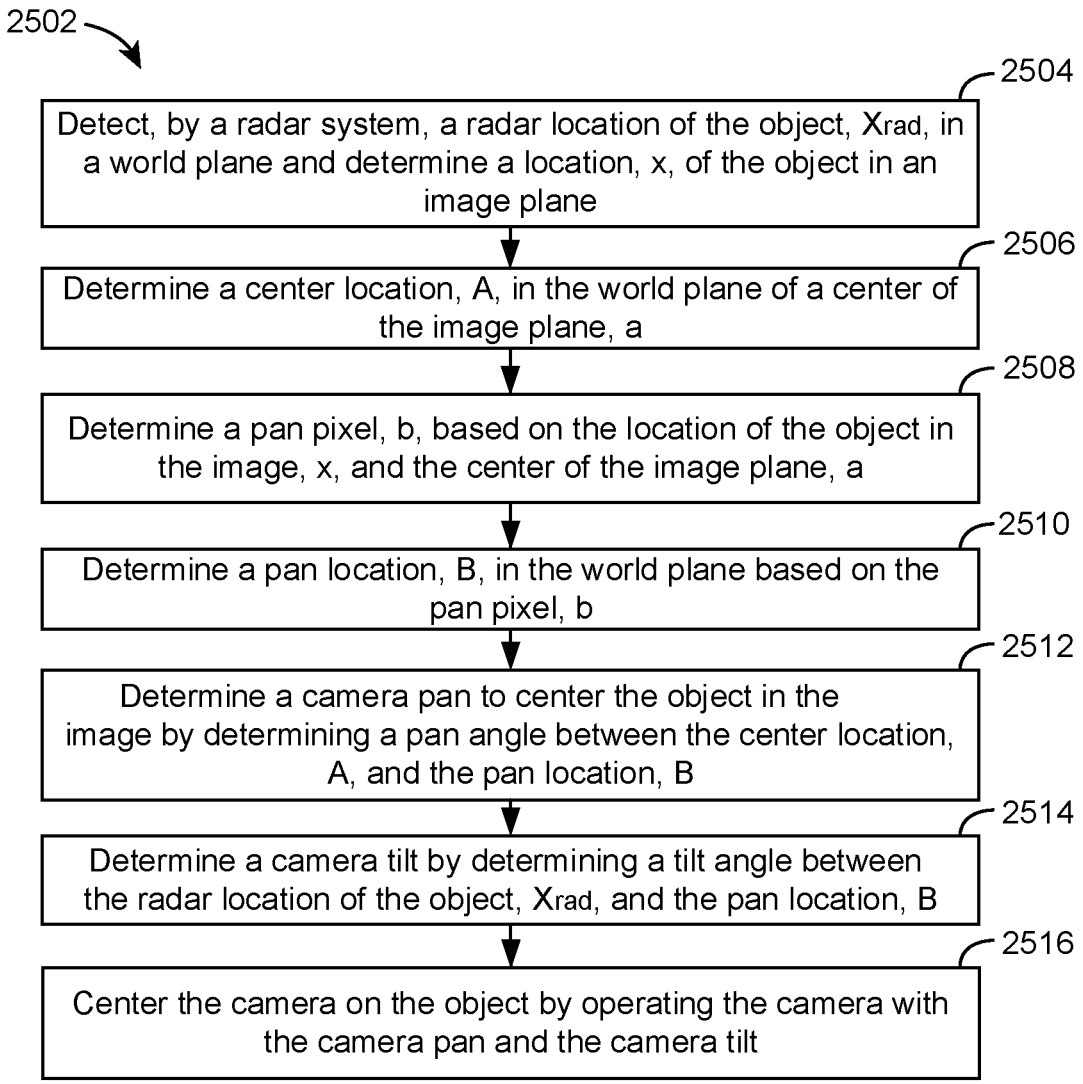
FIG. 25A illustrating control of the camera based on radar data of a radar system that can be performed by the building radar-camera system of FIG. 3, according to an exemplary embodiment.
Figure 25B:
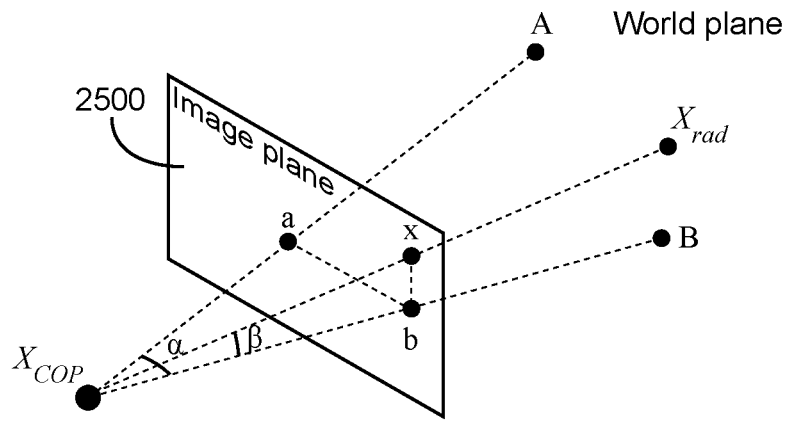
FIG. 25B is a diagram illustrating a world plane of a radar system and a camera plane of a camera and illustrating the process of FIG. 25A, according to an exemplary embodiment.

Referring now to FIGS. 25A-25B, an example of camera control based on radar data is shown, according to an exemplary embodiment. Current radar to camera setup is time consuming and not accurate enough. The semi-automatic calibration process 2100 described with reference to FIGS. 21A-22 can be used and/or modified to solve this problem. The homography between camera and world spaces can point the camera to the radar targets. The manager 302 can receive and/or determine bounding-box pixel location from the network and center the camera on the object. A homography may exist between the world and the camera but does not have the projection matrix. The manager 302 can determine a radar location in the image ($X_{rad}$) and can calculate a world location of a center of an image plane 2500 of the camera, (0,0)→A. The manager 302 can determine a camera pan to be the angle between A and B illustrated in FIG. 25B. The manager 302 can determine a tilt to be the angle between $X_{rad}$ and B.

Referring more particularly to FIG. 25A, the process 2502 is shown in greater detail, according to an exemplary embodiment. The security system manager 302 can be configured to perform the process 2502. Furthermore, the camera manager 318 and/or the calibrator 320 can be configured to perform the process 2502. While any computing device described herein can be configured to perform the process 2502, the process 2502 is described with reference to the camera manager 318.

In step 2504, the camera manager 318 can receive, from the radar system manager 316 and/or the radar system 304, a detection of an object represented in FIG. 25B as $X_{rad}$. Using a homography between a world plane and the image plane 2500, the camera manager 318 can translate the detection $X_{rad}$ in the world plane to a location, x, in the image plane 2500. The homography can be the homography (or reverse homography) described with reference to FIGS. 17A-17B and/or the homography of FIG. 21A-22. In step 2506, a center location, a, of the image plane 2500 can be translated to the world plane via the homography, or the reverse of the homography, used in the step 2504 to determine a center location, A, in the world plane.

In step 2508, the camera manager 318 can determine a pan pixel, b, on the image plane 2500 based on the location of the object in the image, x, and the center of the image plane, a. The camera manager 318 can be configured to determine a horizontal distance between a and x and use the resulting horizontal distance as b. The pan pixel, b, may have a corresponding real world location. In step 2510, the camera manager 318 can translate the pan pixel, b, to a corresponding world plane pan location, B. The translation can be performed with the homography or reverse homography as described with reference to the steps 2504-2508.

In order to center the object of corresponding to the location $X_{rad}$ in the world plane, the camera may be operated according to a camera pan value and a camera tilt value. The camera pan and the camera tilt can be determined in the steps 2512 and 2514 as angles, a and as shown in FIG. 25B. In step 2512, the camera manager 318 can determine a the camera pan that would center the object within the camera by determining a pan angle between the center location, A, and the pan location, B. The camera manager 318 may store the location of the camera and, the distances from the camera to the locations of A and B may be known and used by the camera manager 318 to determine the pan angle, α.

In step 2514, the camera manager 318 can determine a require camera tilt to center the object in the camera by determining a tilt angle between the radar location of the object, $X_{rad}$, and the pan location, B. Again, the camera manager 318 may store the location of the camera and, the distances from the camera to the locations of $X_{rad}$ and B may be known and used by the camera manager 318 to determine the tilt angle, β. In step 2516, based on the camera pan and the camera tilt determined in the steps 2512 and 2514, the camera manager 318 can operate the camera to center the object detected by the radar system manager 316 in the step 2504 within the center of the camera.

Figure 26A:
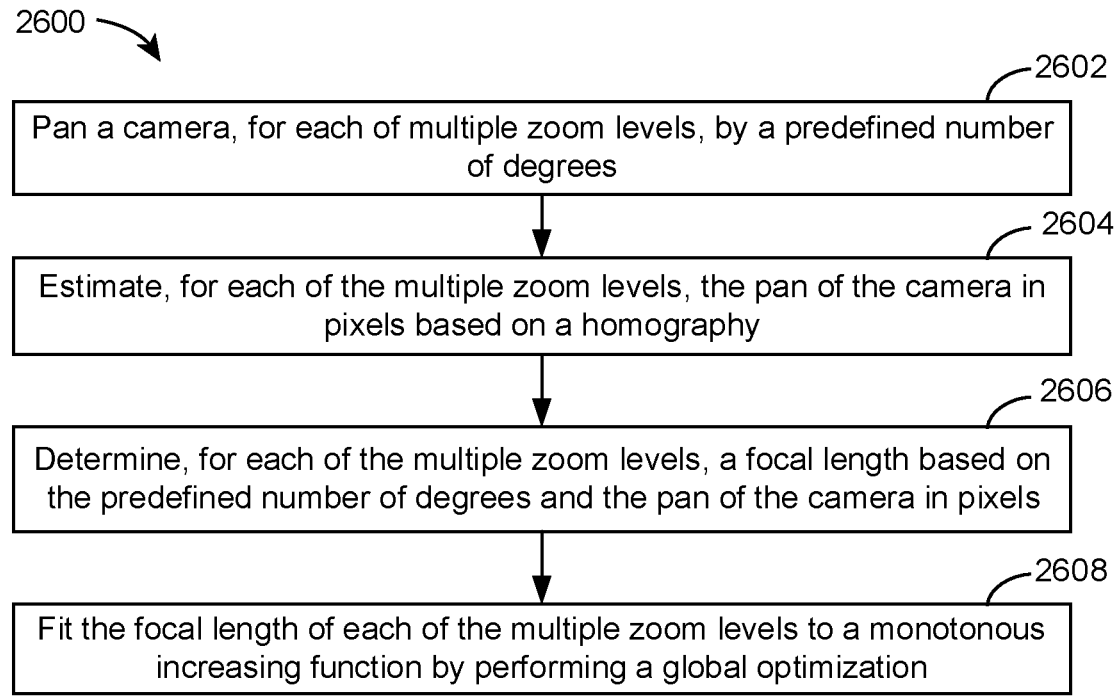
FIG. 26A is a chart illustrating a focal length verse zoom length, according to an exemplary embodiment.
Figure 26B:
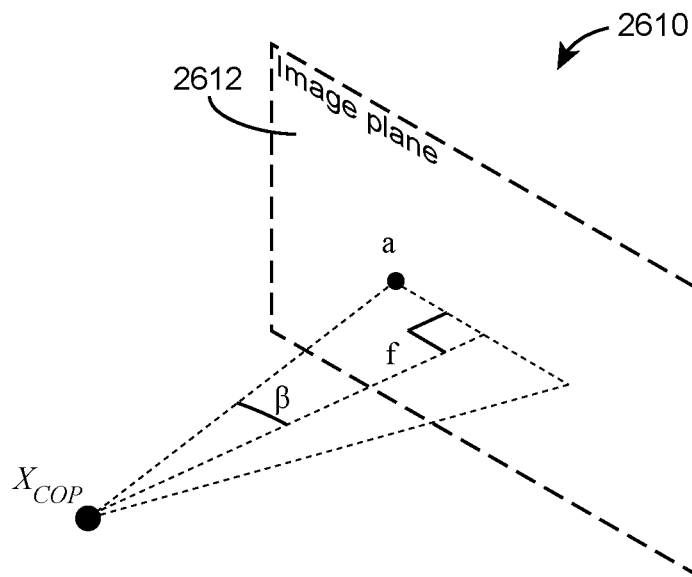
FIG. 26B is a flow diagram of a process of determining a focal length for a camera that can be performed by the building radar-camera system of FIG. 3, according to an exemplary embodiment.

Referring now to FIGS. 26A-26B, a process 2600 is described for controlling camera movement by automatic focal-length estimation, according to an exemplary embodiment. The process described with reference to FIGS. 26A-26B can result in a calibration that can be used to control a camera to zoom on a target and keep it in the center. The process can be a self-calibrating that does not require human interaction but only a scene with a point of interest. The process may be done once for each camera and/or camera mode and can be an internal calibration.

Referring more particularly to FIG. 26A, the security system manager 302 can be configured to perform the process 2600. Furthermore, the camera manager 318 and/or the calibrator 320 can be configured to perform the process 2600. While any computing device described herein can be configured to perform the process 2502, the process 2502 is described with reference to the calibrator 320. For each zoom of a camera, the calibrator 320 can perform the steps 2602-2606 to determine a focal length for each zoom. Once the focal lengths are determined for each zoom, the focal length verse zoom can be fit to a function in step 2608.

In step 2602, the camera manager 318 can pan the camera by a predefined number of degrees, i.e., by β degrees. A previous center of the image, α, may be offset from the center of the image by β degrees as a result of the pan. In step 2604, the camera manager 318 can estimate the pan distance corresponding to the pan angle with a homography. The pan distance can be a horizontal distance in pixel units, $\Delta_{pixel}$. The homography may be predefined and/or can be determined. The homography may be the same as the homography between images as described with reference to FIGS. 12-14.

In step 2606, the camera can determine the focal length $f_z$ based on the pan distance in horizontal pixels determined in the step 2604 and the pan angle β used to operate the camera in step 2602. The focal length, $f_z$, can be the distance in pixels dividend by the tangent of the pan angle β:

$$\frac{\Delta \text{pixel}}{tg(\beta)} = f_z$$

Figure 28:
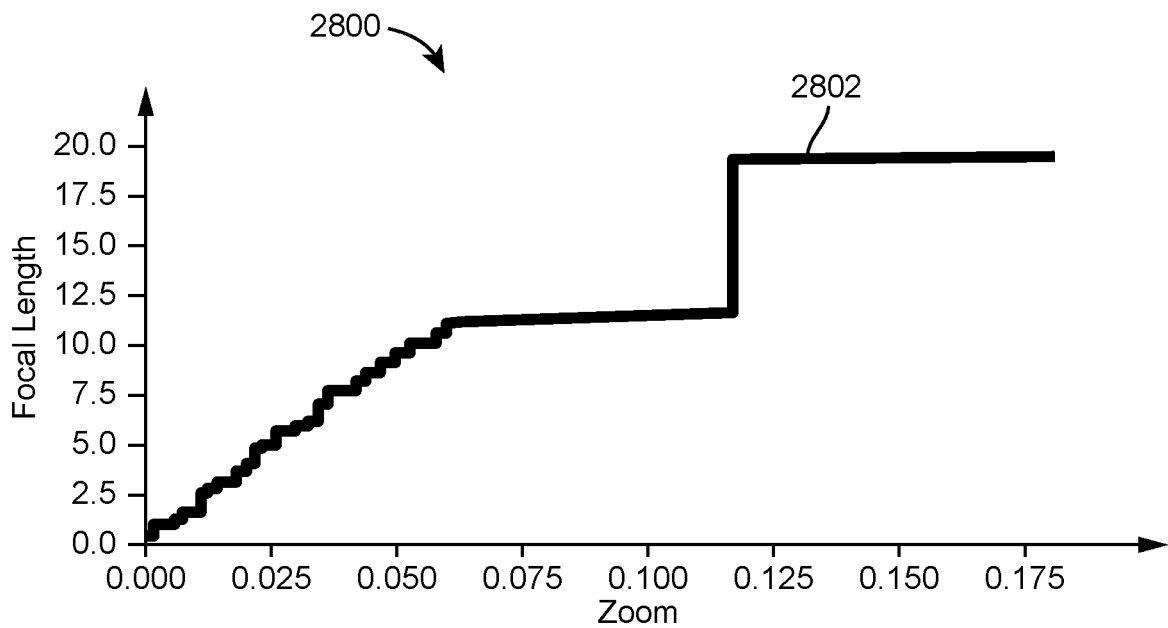
FIG. 28 is an chart of a monotonous increasing function of the process of FIG. 26A relating focal length and camera zoom, according to an exemplary embodiment.

The steps 2602-2606 can be repeated a number of times for each of the zoom lengths resulting in multiple sample focal lengths for each zoom length. The multiple samples of a single zoom length are illustrated in FIG. 28 as a slope, i.e., Δpixel verse tg(β). The resulting focal length can be the focal length of all sample pairs of Δpixel and tg(β) or can be the slope of a line fit to the set of sample pairs.

Once focal lengths of the camera have been determined for each of multiple zoom distances of the camera, the camera manager 318 can perform a global optimization by fitting the focal lengths to a monotonous-increasing function. The calibrator 320 can be configured to perform linear programming to fit the values of the focal length to the closest monotonous-increasing function using the equations:

$$\min_{w} \|w_i - f_i\|_1$$
$$s.t.$$
$$w_i \leq w_{i+1}$$

where $$\min_{w} \|w_i - f_i\|_1$$
$$s.t.$$

can be an objective function and $w_i \leq w_{i+1}$ can be a constraint for the minimization of the objective function. $f_i$ may represent one focal length of a set of focal lengths, the set of focal lengths being focal lengths for multiple zoom levels. $w_i$ may be the corresponding value of the monotonous-increasing function. Optimally, the difference, $w_i - f_i$, is zero. However, due to errors, the difference is not zero and thus the optimization minimizes $w_i-f_i$ such that a monotonous-increasing function, w, is selected with minimal error. The function, w, is forced to a monotonous-increasing function with the constraint $w_i \leq w_{i+1}$ which causes each value of w to be greater than, or equal to, a previous value. Therefore, the function w never decreases in value.

Once the focal-length is computed for each zoom, the camera manager 318 can translate a pixel distance into a degree. The camera manager 318 can be configured to use the fit monotonous-increasing function to perform the translation. For example, if the camera manager 318 needs to determine a panning or tilting distance, the panning or tilting angle can be determined as the inverse tangent of the pixel distance divided by the focal length. The focal length used in the computation which can be determined with the fit monotonous increasing function and a current zoom level, i.e., the focal length can be the output of the fit monotonous increasing function with an input zoom level. FIG. 26B provides a representation of the calculation for determining the focal length, representation 2610, shown to include a representation of an image plane 2612. FIG. 28 provides a plot 2800 of the focal lengths and the corresponding zooms fit to a monotonous-increasing function 2802.

Figure 27:
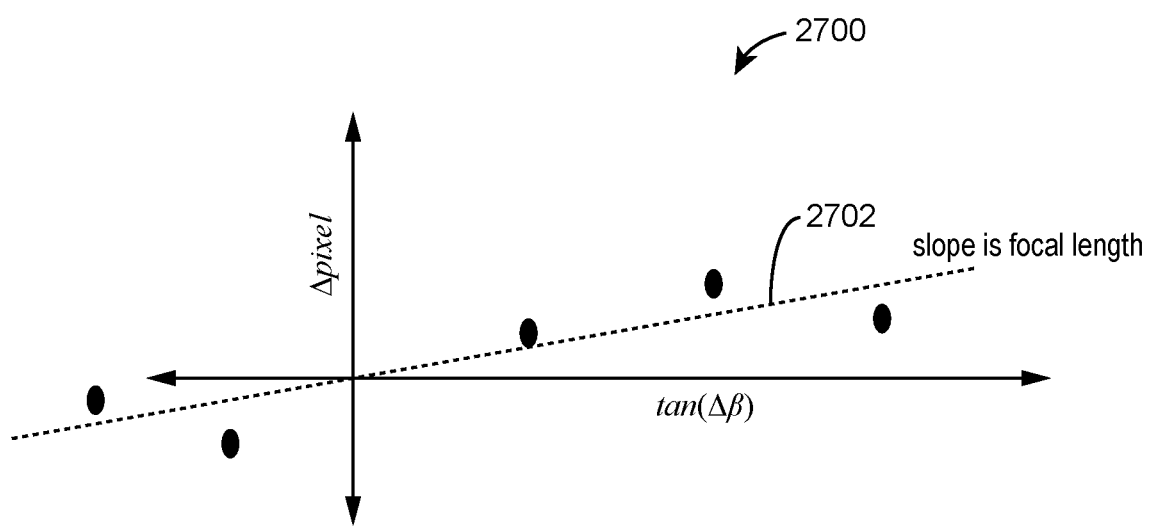
FIG. 27 is a chart of pixel change verse angle change illustrating the process of FIG. 26A, according to an exemplary embodiment.

Referring now to FIG. 27, a plot 2700 illustrating the estimated change in pixels verse the angle of camera movement is shown, according to an exemplary embodiment. The slope of the trend 2702 of the pixel change verse the tangent of the angle change is the focal length of the camera. As can be seen, the plot 2700 is noisy, i.e., it includes error. Therefore, the optimization can be performed by the calibrator 320. An example of a fitting via optimization described with reference to FIG. 26A.

Figure 29:
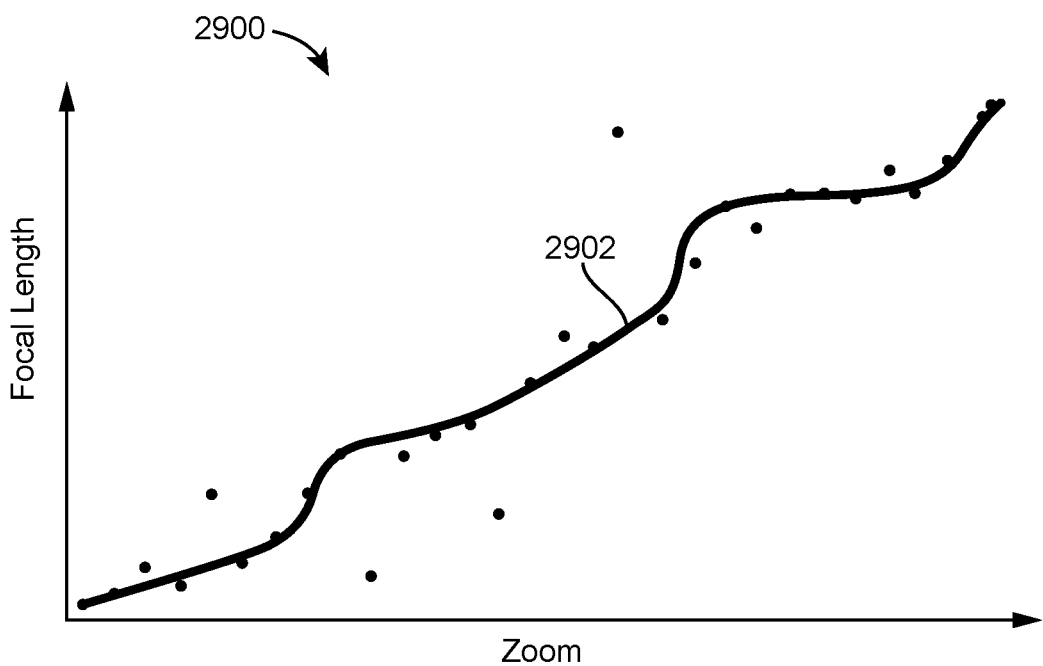
FIG. 29 is another chart illustrating an estimation of a monotonous-increasing function for various focal lengths and zooms illustrating the process of FIG. 26A, according to an exemplary embodiment.

Referring now to FIG. 29, another fitting of focal lengths verses zoom to a monotonous increasing function 2902 is shown by plot 2900. Zoom to focal-length translation allows for an accurate movement of a camera to a target. Focal length should increase along with zoom level. However, as can be seen in the plot 2900, not all the points follow this trend. Therefore, as previously mentioned, the calibrator 320 can be configured to perform linear programming to fit the values of the plot 2900 to the closest monotonous-increasing function using the equations:

$$\min_{w} \|w_i - f_i\|_1$$
$$s.t.$$
$$w_i \leq w_{i+1}$$

where $$\min_{w} \|w_i - f_i\|_1$$
$$s.t.$$

can be an objective function and $w_i \leq w_{i+1}$ can be a constraint for the minimization of the objective function.

Figure 30A:
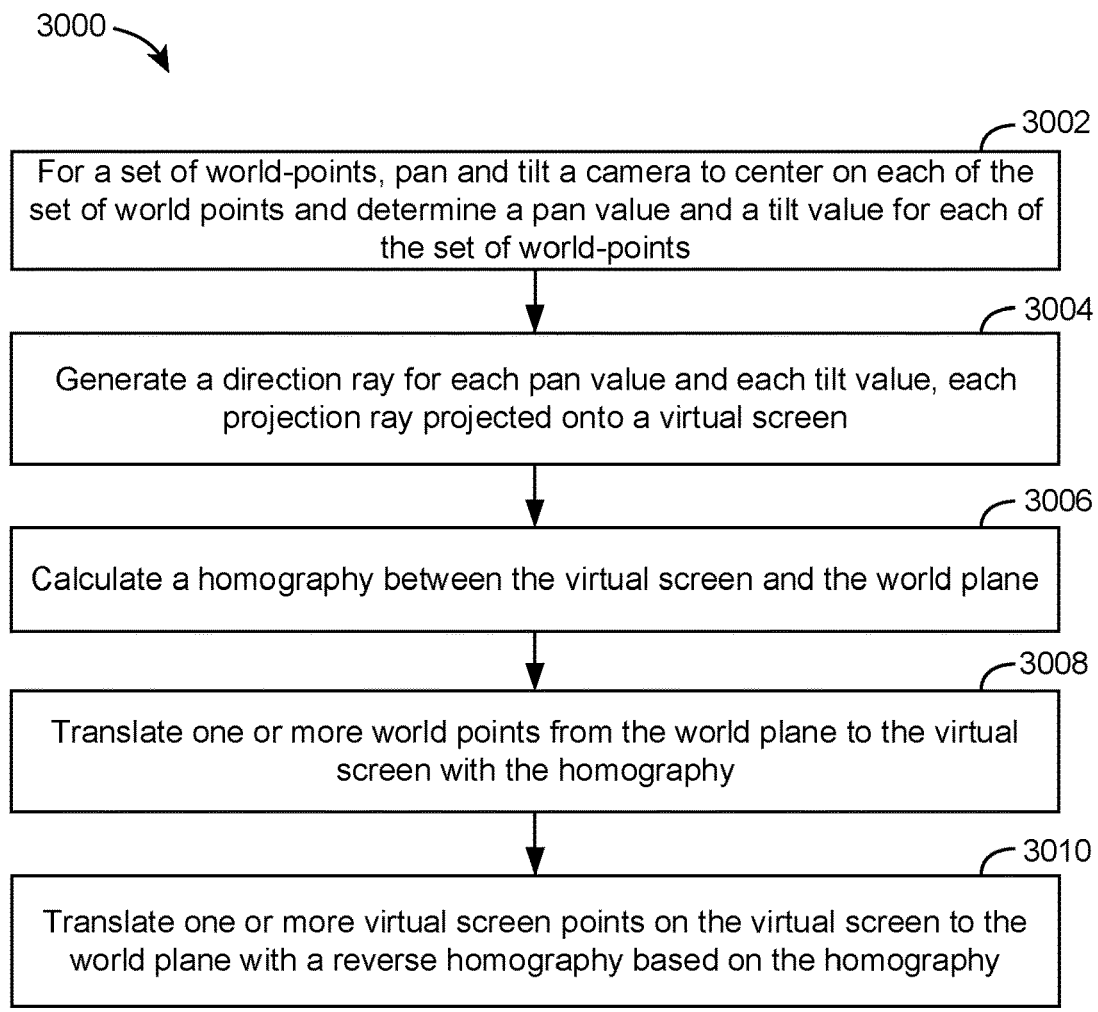
FIG. 30A is a flow diagram of a process for performing a camera calibration without pixel-information that can be performed by the building radar-camera system of FIG. 3, according to an exemplary embodiment.
Figure 30B:
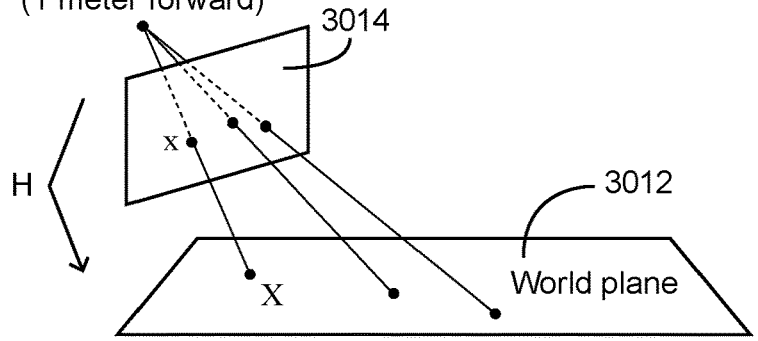
FIG. 30B is an schematic drawing of points on a virtual screen and corresponding points on a world plane illustrating the process of FIG. 30A, according to an exemplary embodiment.

Referring now to FIG. 30A-30B, a process 3000 for calibrating camera movement with pixel-information is shown that can be performed by the calibrator 320, according to an exemplary embodiment. The process 3000 can be an automatic calibration that maps camera rotation directly to a radar space. The process 3000 can use pan and tilt instead of a homography between sequences of images to translate between a camera plane and a world plane. The process 3000 may be invariant to the camera intrinsic parameters and/or zoom level. The calibration can be done directly in the world coordinate system. The security system manager 302 can be configured to perform the process 2600. Furthermore, the camera manager 318 and/or the calibrator 320 can be configured to perform the process 2600. While any computing device described herein can be configured to perform the process 2502, the process 2502 is described with reference to the calibrator 320.

In step 3002, for a set of world-points, the calibrator 320 can orient a camera to center a view on the target and the calibrator 320 can retrieve and/or record a pan and/or tilt value for the camera for each of the movements. In step 3004, for each pan and tilt, the calibrator 320 can generate a direction ray, a projection onto a virtual screen 3014. Each direction ray can include a pan angle and a tilt angle, the pan and tilt angles determined in the step 3002.

In step 3006, the calibrator 320 can determine a homography between the virtual screen 3014 and the world plane 3012. The calibrator 320 may receive radar data of the radar system that indicates a location of each point on the world plane 3012 and thus the homography and between the virtual screen 3014 and the world plane 3012 can be determined based on a correspondence between each direction ray (pan and tilt angle) and the world plane coordinates.

In step 3008, using the homography determined in the step 3006, the calibrator 320 can translate between one or more world coordinates and the pan and tilt of the camera. Similarly, in step 3010, the calibrator 320 can use a reverse homography of the homography determined in the step 3006 to translate between the pan and tilt settings to the world coordinates.

Figure 31:
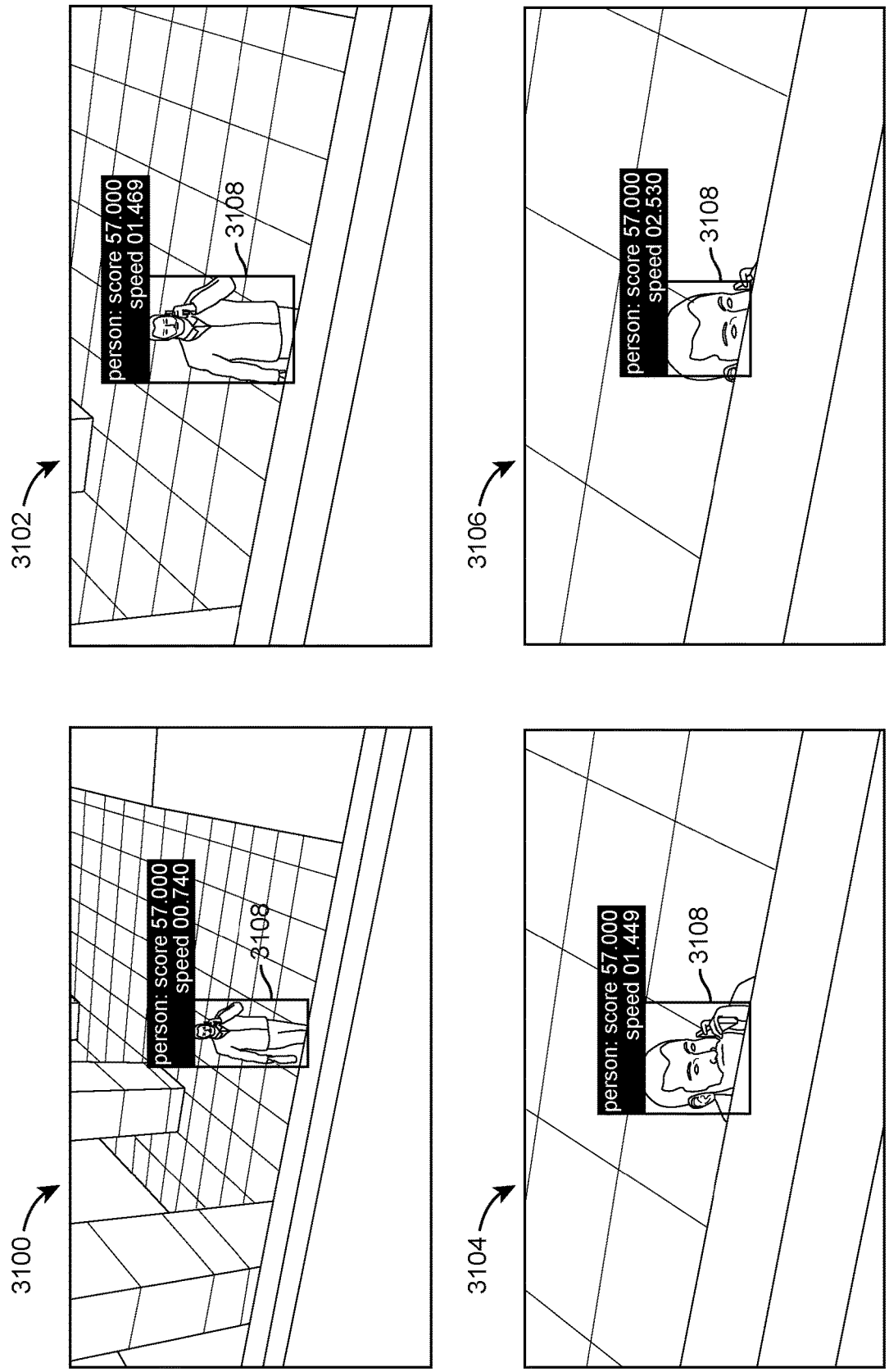
FIG. 31 is an illustration of image tracking of an individual by the radar-camera system of FIG. 3, according to an exemplary embodiment.

Referring now to FIG. 31, images 3100-3106 that can be captured by one of the cameras 306 and/or 308 are shown, according to an exemplary embodiment. The images 3100-3106 illustrate tracking and zooming in on an individual that can be performed by the camera manager 318. More pixels can improve the confidence of object detection performed by the camera manager 318; therefore, the camera capturing the images 3100-3106 may be a high resolution camera. The camera manager 318 can be configured to control the camera so that the individual is kept in the center of the image. The control and tracking may be based on a Kalman filter, a matching algorithm, and a homography as described with reference to FIGS. 5-6. A new location of the individual can be determined and/or transmitted to a monitoring system every second. While the camera is zoomed on target the system may also monitor other objects in the frame.

The camera manager 318 can generate the bounding box 3108 and cause the bounding box 3108 to be included within the images 3100-3106. The bounding box can include information generated by the camera manager 318. For example, the classification determined by the camera manager 318 can be included within the bounding box 3108, i.e., "person." Furthermore, the camera manager 318 can cause the bounding box to include a score associated with the classification, e.g., how likely the object captured within the frames 3100-3106, "57.000." The camera manager 318 can cause the bounding box 3108 to include a speed of the person as well. The camera manager 318 can determine the speed of the individual with a Kalman filter.

Figure 32:
FIG. 32 is an illustration of images for identifying and classifying objects while a camera is moving, according to an exemplary embodiment.
Figure 32:
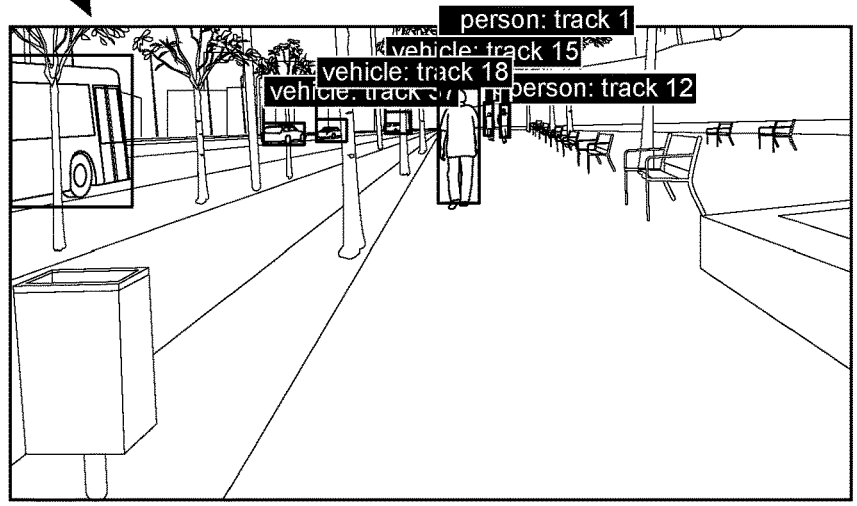
Figure 32:

Referring now to FIG. 32, images 3200-3204 illustrating detecting, tracking, classifying objects by the camera manager 318. The camera capturing the images 3200-3204 may be the camera 306 and/or 308. As can be seen, the camera is moving forward. It is seen that the camera continues to properly detect, track, and classify the objects. Furthermore, the camera manager 318 can reliably detect, track, and/or classify the objects in real time as the camera moves. The performance of the camera manager 318 can reduce false detections. No false detections are shown in images 3200-3204 even though the camera is moving.

Figure 33:
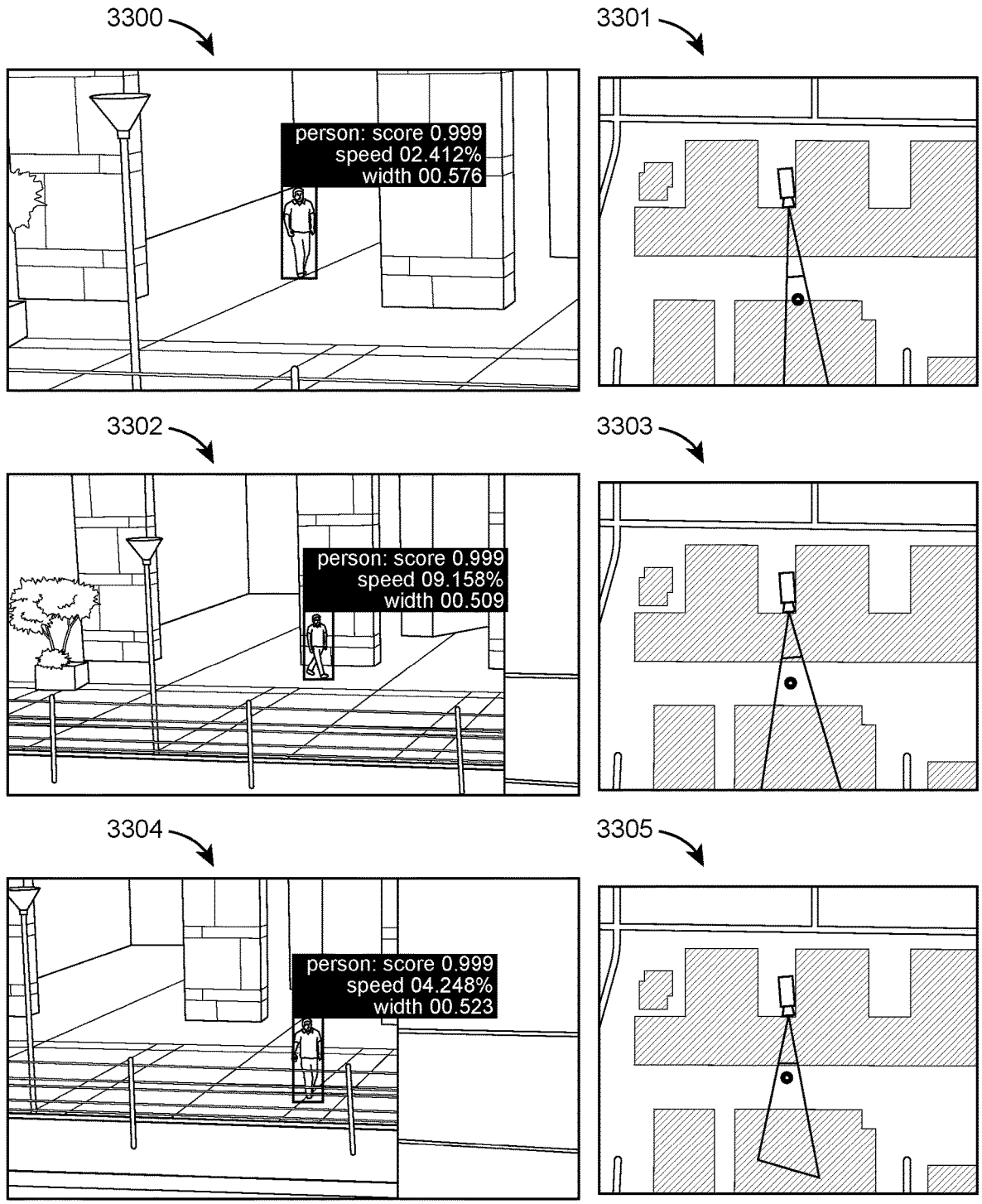
FIG. 33 is an illustration of images indicating both radar and camera image tracking of the radar-camera system of FIG. 3, according to an exemplary embodiment.

Referring now to FIG. 33, images 3300-3304 are shown illustrating detection and tracking of a user in a camera view and a world view, according to an exemplary embodiment. For the images 3300-3304, the left side indicates a camera view, e.g., a camera captured image via one of the cameras 306 and/or 308. The right side indicates a world view. The world view can indicate radar coordinates. In some embodiments, the camera capturing the left side of images 3300-3304 can be controlled capture images of the people if the radar system 304 detects the people. In some embodiments, the camera can identify the people and determine the locations in the world view of the individuals solely based on the camera detected images and not based on the radar system 304. In this regard, the indications of the individuals on the right side of images 3300-3304 can be determined based on either the radar system 304 and/or the images of the cameras 306-308.

Figure 34:
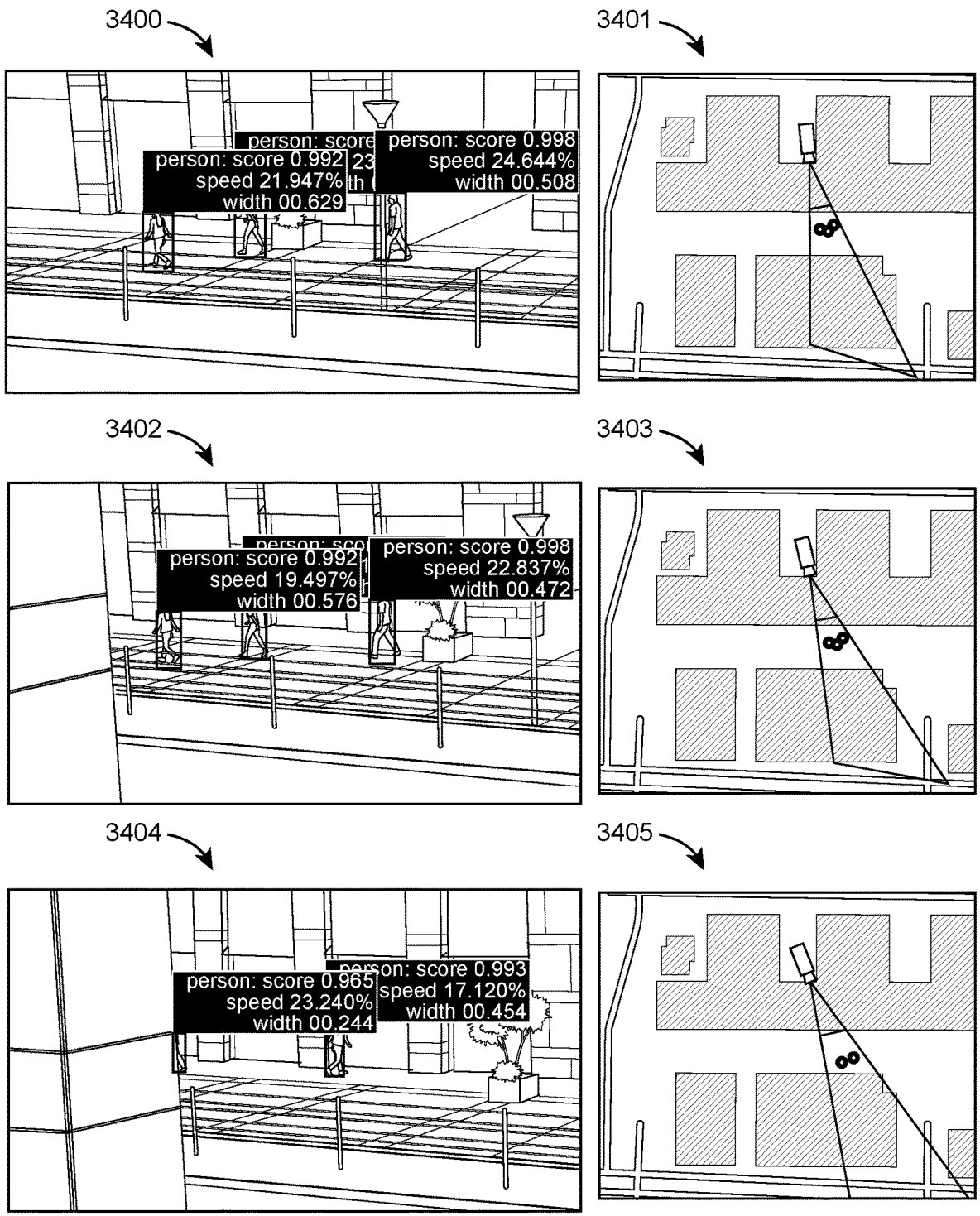
FIG. 34 is an illustration of images indicating both radar and camera image tracking of multiple individuals by the radar-camera system of FIG. 3, according to an exemplary embodiment.

Referring now to FIG. 34, images 3400-3404 and 3401-3405 are shown indicating detection, tracking, and classification of multiple individuals by the camera manager 318, according to an exemplary embodiment. In images 3400-3404, frames captured by the camera 306 and/or 308 are shown. As can be seen, the camera is operated to keep all three of the moving individuals within the frame of the camera. In images 3401-3405, the locations of the individuals are shown in world coordinates. The locations shown in the images 3401-3405 can be detections of the camera translated to world coordinates. Furthermore, the locations can be detections via the radar system 304. Each of the objects (people) in FIG. 34 are shown to be bounded by a box. The box may include an indication including an identification (e.g., person, animal, car, boat, plane, motorcycle, etc.), a score, and a speed of the object. The score may indicate the certainty of the classification of the object.

In some embodiments, a user can provide an input to one of the images 3301-3305 via a user device. For example, the user may click on a location within the images 3301-3305. The location on which the user clicks may correspond to a world-space location. Based on a homography between a camera and the world space, the camera system can orient the camera to view the location clicked-on by the user. For example, the sphere-to-plane holography of FIGS. 17A-17B (or the other homography and control algorithms discussed herein) can be used to orient the camera according to the input by the user.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building radar-camera system, comprising:
one or more memory devices storing instructions thereon that, when executed by one or more processors, cause the one or more processors to:
receive, from a camera of the building radar-camera system, one or more images comprising first locations within the one or more images of one or more points on a world-plane;
receive, from a radar system of the building radar-camera system, radar data indicating second locations on the world-plane of the one or more points;
receive a correspondence between the first locations and the second locations of the one or more points, the correspondence associating each of the first locations with one of the second locations; and
generate a sphere-to-plane homography, the sphere-to-plane homography translating between points captured by the camera and the world-plane based on the correspondence between the first locations and the second locations.

2. The building radar-camera system of claim 1, further comprising:
the camera configured to capture the one or more images, the one or more images comprising the first locations within the one or more images of the one or more points on the world-plane; and
the radar system configured to capture the radar data indicating the second locations on the world-plane of the one or more points.

3. The building radar-camera system of claim 1, wherein the instructions cause the one or more processors to perform an external camera calibration by:
receiving a set of images from the camera, the set of images being captured by the camera while moving to track an object;
transferring a set of detections of the set of images to a first image of the set of images based on one or more homographies;
receiving a radar track from the radar system, the radar track indicating locations of the object overtime;
determining a homography between the first image and the world-plane based on the set of detections transferred to the first image and the radar track; and
determining a second correspondence between the set of detections and the radar track based on the set of detections transferred to the world-plane and the radar track.

4. The building radar-camera system of claim 1, wherein the instructions cause the one or more processors to perform an external camera calibration by:
receiving camera tracks indication locations of an object in pixel values across a set of images of the camera, the set of images being captured by the camera while moving to track the object;
transferring the pixel values to a first image of the set of images based on one or more homographies;
receiving radar tracks from the radar system, the radar tracks indicating locations of the object overtime in angle values;
determining a plurality of distances between the camera tracks and the radar tracks based on the pixel values transferred to the first image and the angle values; and
performing a matching algorithm to match the radar tracks with the camera tracks based on the plurality of distances.

5. The building radar-camera system of claim 1, wherein the instructions cause the one or more processors to:
receive a detection of an object from the radar system in the world-plane;
determine, based on a homography, a location of the object in a camera plane of the camera;
determine a center location in the world-plane with the homography based on a center of the camera plane;
determine a pan pixel in the camera plane based on the location of the object in the camera plane and the center of the camera plane;
determine a pan location in the world-plane based on the pan pixel and the homography;
determine a camera pan to center the object in a field of view of the camera as a first angle between the center location and the pan location;
determine a camera tilt to center the object in the field of view of the camera by determining a second angle between the detection of the object and the pan location; and
operate the camera to center the object in the field of view of the camera based on the camera pan and the camera tilt.

6. The building radar-camera system of claim 1, wherein the instructions cause the one or more processors to perform an external calibration by:
operating the camera to sequentially center a set of world-points within a field of view of the camera;
generate a plurality of direction rays, each of the plurality of direction rays including a pan value and a tilt value used to control the camera to center one world-point of the set of world-points within the field of view of the camera;
determining a homography between a virtual screen intersected by the plurality of direction rays and the world-plane; and
translating between a point on the world-plane and a particular pan value and a particular tilt value based on the homography.

7. The building radar-camera system of claim 1, wherein the instructions cause the one or more processors to perform an internal camera calibration by:
panning the camera at a zoom level by a predefined number of degrees;
estimating a pixel distance indicating a distance panned by the camera in pixel units based on a homography;
determining a focal length for the zoom level based on the predefined number of degrees and the pixel distance; and
fitting a function with the focal length and the zoom level and a plurality of other focal lengths, each of the plurality of other focal lengths corresponding to one of a plurality of zoom levels.

8. The building radar-camera system of claim 7, wherein the function is a monotonous increasing function;
wherein fitting the function comprises optimizing an objective function to determine a value of the function for each of the plurality of zoom levels with respect to an optimization constraint;
wherein the optimization constraint indicates that a current value of the function is greater than or equal to a previous value of the function.

9. The building radar-camera system of claim 1, wherein the instructions cause the one or more processors to generate the sphere-to-plane homography by:
performing an optimization to identify values for the sphere-to-plane homography that minimize one or more error values.

10. The building radar-camera system of claim 9, wherein the sphere is a unit-sphere
wherein the one or more error values are:
a first error value indicating a geodesics distance between the first locations and the second locations translated onto the unit-sphere with the values of the sphere-to-plane homography; and
a second error value indicating a planar distance between the first locations translated onto the world-plane with the values of the sphere-to-plane homography and the second locations.

11. A method of a building radar-camera system, comprising:
receiving, by one or more processing circuits, one or more images from a camera, the one or more images comprising first locations within the one or more images of one or more points on a world-plane;

receiving, by the one or more processing circuits, radar data from a radar system, the radar data indicating second locations on the world-plane of the one or more points;

receiving, by the one or more processing circuits, a correspondence between the first locations and the second locations of the one or more points, the correspondence associating each of the first locations with one of the second locations; and generating, by the one or more processing circuits, a sphere-to-plane homography, the sphere-to-plane homography translating between points captured by the camera and the world-plane based on the correspondence between the first locations and the second locations.

12. The method of claim 11, further comprising performing, by the one or more processing circuits, an external camera calibration by:

receiving a set of images from the camera, the set of images being captured by the camera while moving to track an object;

transferring a set of detections of the set of images to a first image of the set of images based on one or more homographies;

receiving a radar track from the radar system, the radar track indicating locations of the object overtime;

determining a homography between the first image and the world-plane based on the set of detections transferred to the first image and the radar track; and determining a second correspondence between the set of detections and the radar track based on the set of detections transferred to the world-plane and the radar track.

13. The method of claim 11, further comprising performing, by the one or more processing circuits, an external camera calibration by:

receiving camera tracks indication locations of an object in pixel values across a set of images of the camera, the set of images being captured by the camera while moving to track the object;

transferring the pixel values to a first image of the set of images based on one or more homographies;

receiving radar tracks from the radar system, the radar tracks indicating locations of the object overtime in angle values;

determining a plurality of distances between the camera tracks and the radar tracks based on the pixel values transferred to the first image and the angle values; and performing a matching algorithm to match the radar tracks with the camera tracks based on the plurality of distances.

14. The method of claim 11, further comprising:

receiving, by the one or more processing circuits, a detection of an object from the radar system in the world-plane;

determining, by the one or more processing circuits, a location of the object in a camera plane of the camera based on a homography;

determining, by the one or more processing circuits, a center location in the world-plane with the homography based on a center of the camera plane;

determining, by the one or more processing circuits, a pan pixel in the camera plane based on the location of the object in the camera plane and the center of the camera plane;

determining, by the one or more processing circuits, a pan location in the world-plane based on the pan pixel and the homography;

determining, by the one or more processing circuits, a camera pan to center the object in a field of view of the camera as a first angle between the center location and the pan location;

determining, by the one or more processing circuits, a camera tilt to center the object in the field of view of the camera by determining a second angle between the detection of the object and the pan location; and operating, by the one or more processing circuits, the camera to center the object in the field of view of the camera based on the camera pan and the camera tilt.

15. The method of claim 11, further comprising performing, by the one or more processing circuits, an external calibration by:

operating the camera to sequentially center a set of world-points within a field of view of the camera;

generating a plurality of direction rays, each of the plurality of direction rays including a pan value and a tilt value used to control the camera to center one world point of the set of world-points within the field of view of the camera;

determining a homography between a virtual screen intersected by the plurality of direction rays and the world-plane; and translating between a point on the world-plane and a particular pan value and a particular tilt value based on the homography.

16. The method of claim 11, further comprising performing, by the one or more processing circuits, an internal camera calibration by:

panning the camera at a zoom level by a predefined number of degrees;

estimating a pixel distance indicating a distance panned by the camera in pixel units based on a homography;

determining a focal length for the zoom level based on the predefined number of degrees and the pixel distance; and fitting a function with the focal length and the zoom level and a plurality of other focal lengths, each of the plurality of other focal lengths corresponding to one of a plurality of zoom levels.

17. The method of claim 16, wherein the function is a monotonous increasing function;

wherein fitting the function comprises optimizing an objective function to determine a value of the function for each of the plurality of zoom levels with respect to an optimization constraint;

wherein the optimization constraint indicates that a current value of the function is greater than or equal to a previous value of the function.

18. The method of claim 11, wherein generating, by the one or more processing circuits, the sphere-to-plane homography comprises:

performing an optimization to identify values for the sphere-to-plane homography that minimize one or more error values.

19. The method of claim 18, wherein the one or more error values are:

a first error value indicating a geodesics distance between the first locations and the second locations translated onto the sphere with the values of the sphere-to-plane homography; and a second error value indicating a planar distance between the first locations translated onto the world-plane with the values of the sphere-to-plane homography and the second locations.

20. A building surveillance system, comprising:
one or more processing circuits configured to:
- receive, from a camera of the building surveillance system, one or more images comprising first locations within the one or more images of one or more points on a world-plane;
- receive, from a radar system of the building surveillance system, radar data indicating second locations on the world-plane of the one or more points;
- receive a correspondence between the first locations and the second locations of the one or more points, the correspondence associating each of the first locations with one of the second locations; and
- generate a sphere-to-plane homography, the sphere-to-plane homography translating between points captured by the camera and the world-plane based on the correspondence between the first locations and the second locations.

\* \* \* \* \*